US010589836B2

(12) United States Patent
Sankrithi et al.

(10) Patent No.: US 10,589,836 B2
(45) Date of Patent: *Mar. 17, 2020

(54) SPLIT LEVEL FORWARD DOUBLE DECK AIRLINER

(71) Applicant: The Boeing Company, Chicago, IL (US)

(72) Inventors: Mithra M. K. V. Sankrithi, Lake Forest Park, WA (US); Sergey D. Barmichev, Bothell, WA (US)

(73) Assignee: THE BOEING COMPANY, Chicago, IL (US)

( * ) Notice: Subject to any disclaimer, the term of this patent is extended or adjusted under 35 U.S.C. 154(b) by 854 days.

This patent is subject to a terminal disclaimer.

(21) Appl. No.: 15/199,783

(22) Filed: Jun. 30, 2016

(65) Prior Publication Data

US 2016/0311516 A1    Oct. 27, 2016

Related U.S. Application Data

(63) Continuation-in-part of application No. 12/716,606, filed on Mar. 3, 2010, now Pat. No. 9,452,817.

(51) Int. Cl.
*B64C 1/20* (2006.01)
*B64C 1/00* (2006.01)
*B64D 11/00* (2006.01)

(52) U.S. Cl.
CPC ............ *B64C 1/20* (2013.01); *B64D 11/00* (2013.01); *B64C 2001/0027* (2013.01); *B64C 2001/0045* (2013.01)

(58) Field of Classification Search
CPC ............ B64C 1/20; B64C 2001/0027; B64D 11/0601
See application file for complete search history.

(56) References Cited

U.S. PATENT DOCUMENTS 1,384,784 A    7/1921    Shankland
1,859,807 A    5/1932    Stout
(Continued)

FOREIGN PATENT DOCUMENTS

EP    2460727        6/2012
EP    2840023 A1    2/2015
(Continued)

OTHER PUBLICATIONS

King, H. F., "The Story of the Brabazon", Sep. 29, 1949, Flight No. 2127, vol. LVI, pp. 409-422; accessed online from flightglobal.com (Year: 1949).*

(Continued)

*Primary Examiner* — Richard R. Green
(74) *Attorney, Agent, or Firm* — Parsons Behle & Latimer

(57) ABSTRACT

An aircraft includes a fuselage, having a crown section and a keel, a first passenger cabin, having a first floor, located in an aft portion the fuselage, and a first cargo deck, located below at least a portion of the first passenger cabin. A forward split level cabin including an upper second cabin having a second floor above the level of the first floor, and a lower third cabin beneath the upper second cabin and having a third floor below the level of the first floor. A second cargo deck is located in the forward portion of the fuselage and beneath at least a portion of the lower third cabin. The crown section has a substantially constant cross-sectional shape fore-to-aft above the first passenger cabin and the split level cabin.

30 Claims, 23 Drawing Sheets

(56) References Cited

U.S. PATENT DOCUMENTS

| | | |
|---|---|---|
| D921,890 | 5/1934 | Minshall et al. |
| 2,236,482 A | 3/1941 | Zindel |
| 2,281,581 A | 5/1942 | Horton |
| 2,761,637 A | 9/1959 | Brumby et al. |
| 3,948,469 A | 4/1976 | Brown |
| 4,022,404 A | 5/1977 | Greiss |
| 4,055,317 A | 10/1977 | Greiss |
| 4,066,227 A | 1/1978 | Buchsel |
| 4,641,796 A | 2/1987 | Feifel |
| 4,653,707 A | 3/1987 | Hamilton et al. |
| 5,063,859 A | 11/1991 | Rader |
| 5,086,996 A | 2/1992 | Roeder et al. |
| 5,115,999 A | 5/1992 | Buchsel et al. |
| 5,314,143 A | 5/1994 | Luria |
| 5,395,075 A | 3/1995 | Sprenger et al. |
| 5,474,260 A | 12/1995 | Schwertfeger et al. |
| 5,496,000 A | 3/1996 | Mueller |
| 5,540,404 A | 7/1996 | Battenfield |
| 5,716,026 A | 2/1998 | Pascasio et al. |
| 5,752,673 A | 5/1998 | Schliwa et al. |
| 5,784,836 A | 7/1998 | Ehrick |
| 5,875,997 A | 3/1999 | Al-Sabah |
| 5,992,797 A | 11/1999 | Seidel et al. |
| 6,056,239 A | 5/2000 | Cantu et al. |
| 6,073,883 A | 6/2000 | Ohlmann et al. |
| 6,152,400 A | 11/2000 | Sankrithi et al. |
| 6,237,872 B1 | 5/2001 | Bar-Levav |
| 6,478,253 B1 | 11/2002 | Seidel |
| 6,616,098 B2 | 9/2003 | Mills |
| 6,666,406 B2 | 12/2003 | Sankrithi et al. |
| 6,702,232 B2 | 3/2004 | Dovey et al. |
| 6,705,567 B2 | 3/2004 | Dong et al. |
| 6,772,977 B2 | 8/2004 | Dees et al. |
| 6,808,142 B2 | 10/2004 | Oki |
| 7,290,735 B2 | 11/2007 | Saint-Jalmes et al. |
| 7,395,989 B2 | 7/2008 | Saint-Jalmes et al. |
| 7,536,958 B2 | 5/2009 | Bravo et al. |
| 7,621,482 B2 | 11/2009 | Sankrithi et al. |
| 7,644,888 B2 | 1/2010 | Eakins et al. |
| 8,608,108 B2 | 12/2013 | Boren et al. |
| 2002/0033432 A1 | 3/2002 | Mikosza |
| 2002/0153454 A1 | 10/2002 | Seidel |
| 2003/0029967 A1 | 2/2003 | Mills |
| 2007/0125909 A1 | 6/2007 | Seiersen et al. |
| 2008/0179457 A1 | 7/2008 | Guering |
| 2008/0191087 A1 | 8/2008 | Cros |
| 2008/0245925 A1 | 10/2008 | Udall |
| 2008/0251641 A1 | 10/2008 | Sprenger |
| 2008/0309201 A1 | 12/2008 | Ota |
| 2010/0155531 A1 | 6/2010 | Lynas |
| 2012/0138743 A1 | 6/2012 | Boren et al. |
| 2013/0119203 A1 | 5/2013 | Dupont |
| 2013/0334368 A1 | 12/2013 | Sankrithi et al. |
| 2014/0166807 A1 | 6/2014 | Boren et al. |

FOREIGN PATENT DOCUMENTS

| | | |
|---|---|---|
| WO | WO2006005550 | 1/2006 |
| WO | WO2008132087 | 11/2008 |

OTHER PUBLICATIONS

Beal, Pamela, et al; VLCT-13, "A Commercial Transport for the 21st Cetnry," California Polytechnic State University, San Luis Obispo, CA; May 14, 1993, NASA Technical Report No. NASA-CR-195492, May 14, 1993.

Duran, David, et al; The AC-120; "The Advanced Commercial Transport Preliminary Design of a 100 to 150 Passenger Commercial Transport;" Presented to Professor Robert van't REit; Aeronautical Engineering Department, California Polytechnic State University, May 14, 1993.

JAL—Japan Airlines "MD-11/MD-11 Stretch, Executive Briefing for JAL," McDonnell Douglas, Dec. 1, 1989, Presentation, pp. 1-10.

Swihart, John M. et a; "Low Direct Operating Cost Transpacific Commercial Transport Family," American Institute of Aeronautics, Inc., 1997.

Bauhaus Luftfahrt, "Claire Liner," Prof. Frediani, Universit' di Pisa, and Atena Engineering GmbH, 2008, Presentation, pp. 1-12, Jan. 1, 2008.

Schmitt & Luftfahrt, "Imagining the aircraft of the future", ASD Focus, Issue 04, Summer 2009, pp. 14-15 Jul. 1, 2009.

Hornung & Luftfahrt, "Aviation in 2030+: Visions, Concepts and Chances of Realisation", Nov. 23, 2011, Presentation, Royal Aeronautical Society, Toulouse Branch, pp. 26-29.

Luftahrt, Bauhaus, Paper, ACARE Targets: for Growth and Sustainability, MTU Press Conference, Munich, Jul. 18, 2007.

European Patent Office; Search Report for EP Application No. 14172650.5 dated Nov. 12, 2014.

US Patent and Trademark Office; Non-Final Office Action for U.S. Appl. No. 13/973,843 dated Mar. 21, 2014.

US Patent and Trademark Office; Non-Final Office Action for U.S. Appl. No. 13/973,843 dated Sep. 25, 2014.

US Patent and Trademark Office; Non-Final Office Action for U.S. Appl. No. 12/716,606 dated Apr. 12, 2012.

US Patent and Trademark Office; Final Office Action for U.S. Appl. No. 12/716,606 dated Nov. 23, 2012.

European Patent Office; Examination Report; European Patent Application No. 17165211.8 dated Sep. 6, 2018.

European Patent Office; Extended European Search Report for Application No. 17165211.8 dated Oct. 20, 2017.

European Patent Office; Office Action; European Patent Application No. 17165211.8; dated Apr. 10, 2019.

* cited by examiner

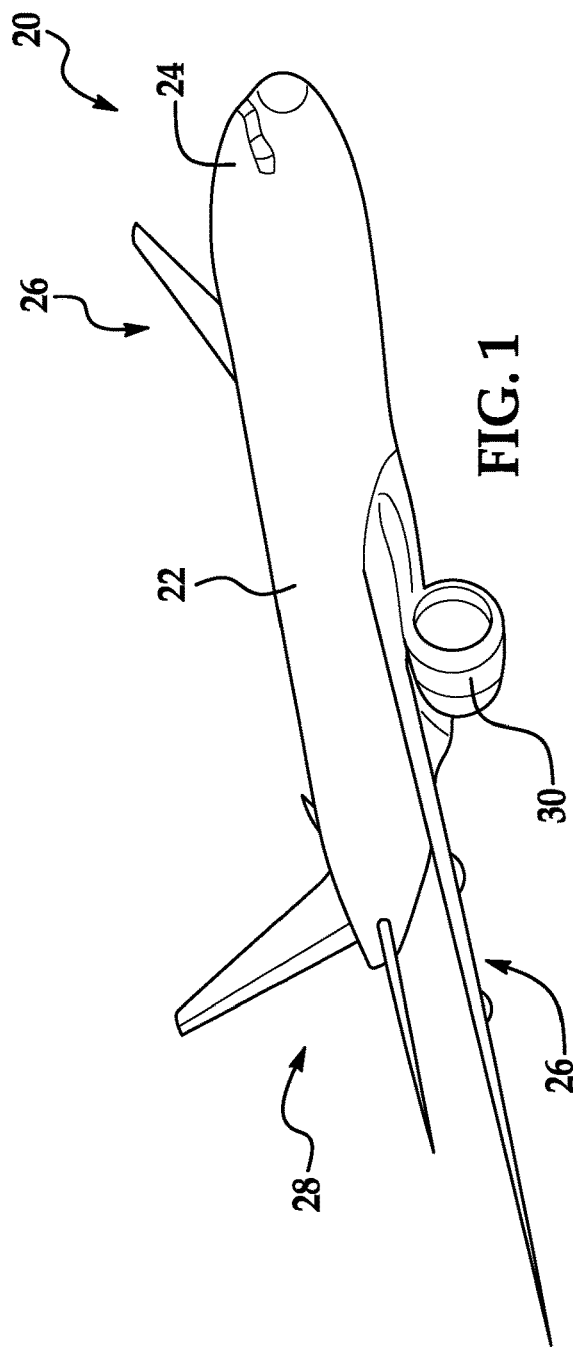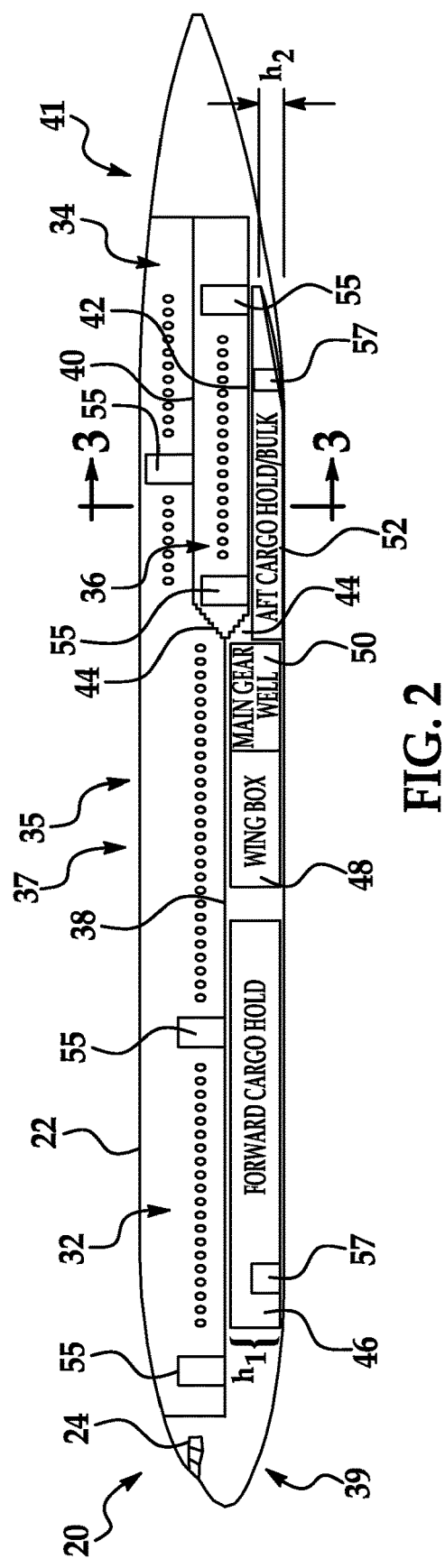
FIG. 1
FIG. 2

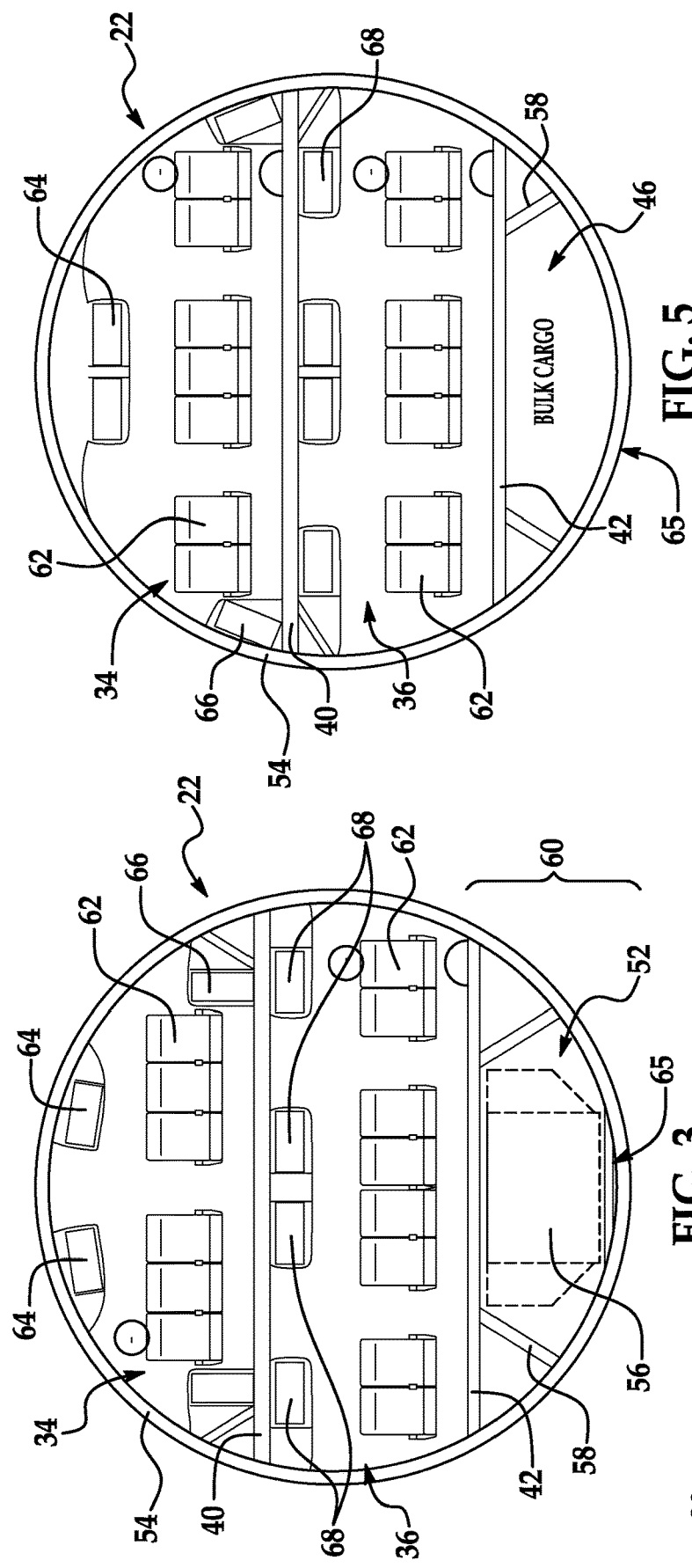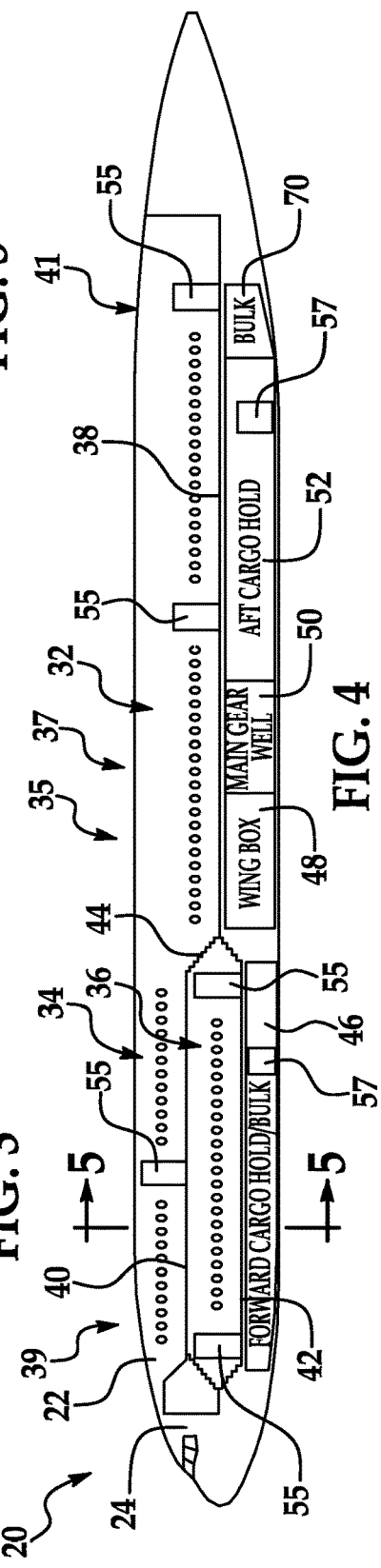

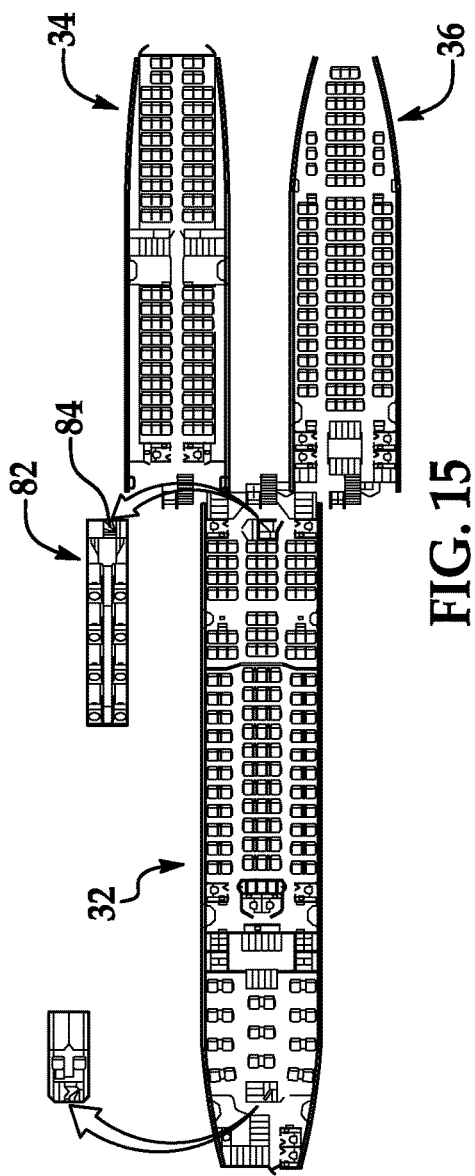
FIG. 15
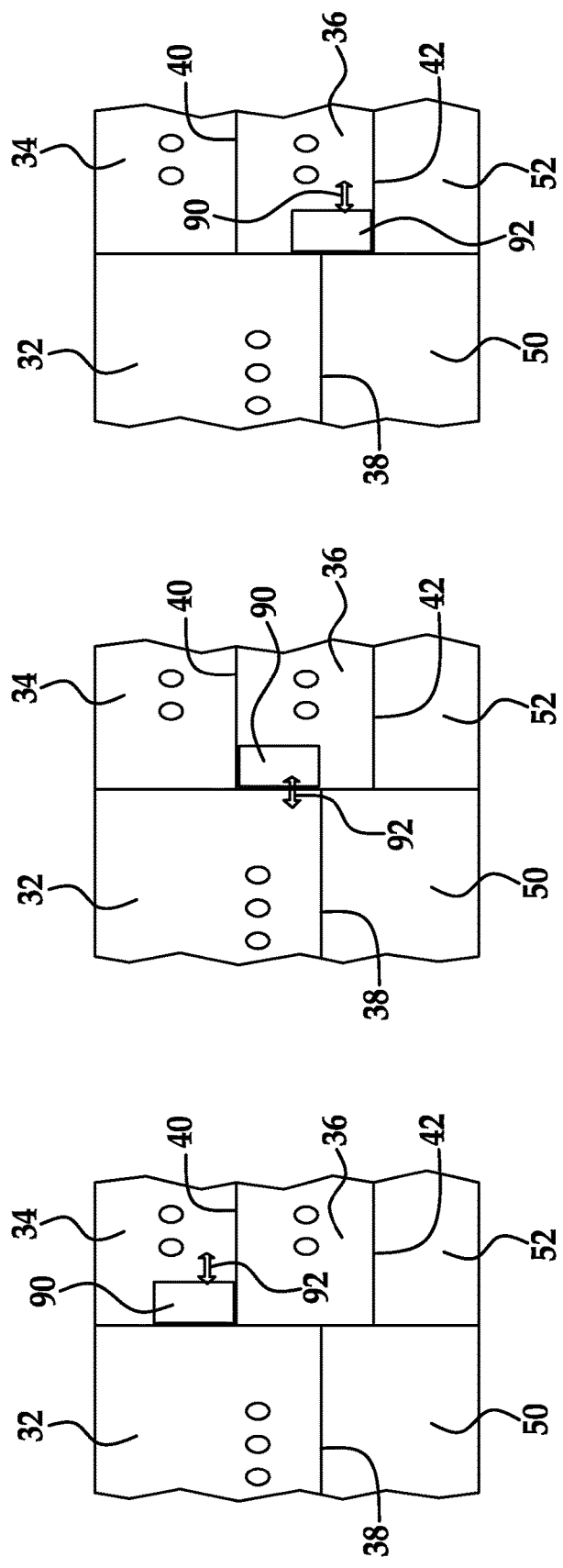
FIG. 16C
FIG. 16B
FIG. 16A

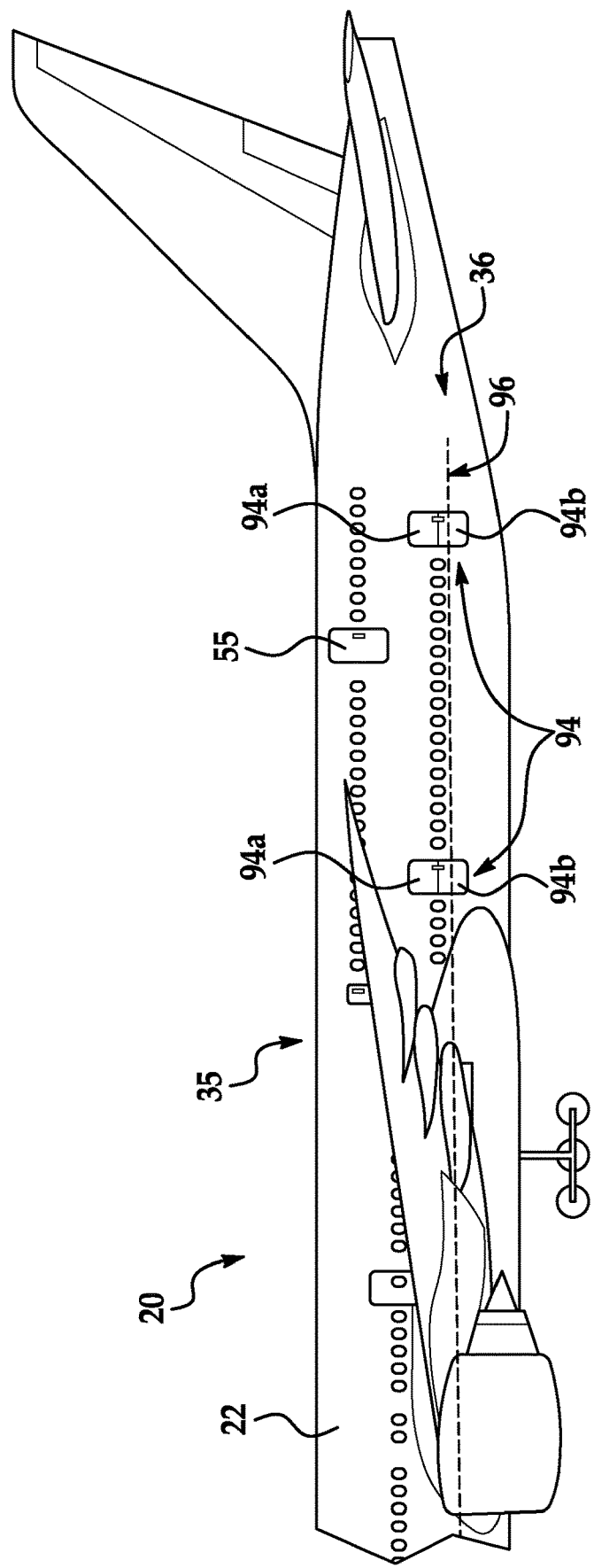

SPLIT LEVEL FORWARD DOUBLE DECK AIRLINER

PRIORITY CLAIM

The present application is a continuation-in-part of co-pending U.S. patent application Ser. No. 12/716,606, filed Mar. 3, 2010 and entitled AIRCRAFT HAVING SPLIT LEVEL CABIN FLOORS, the disclosure of which is incorporated herein by reference in its entirety.

TECHNICAL FIELD

This disclosure generally relates aircraft fuselage configurations and cabin layouts, and deals more particularly with a split level cabin floor configuration.

BACKGROUND

The operating efficiency of commercial and military aircraft may depend upon the efficient use of the volume of space within the aircraft's fuselage. Optimizing the use of fuselage volume may allow the aircraft to carry higher payloads of passengers and/or cargo. The ability to carry higher revenue payloads reduces operating expenses relative to revenue, while simultaneously reducing fuel burn per seat-kilometer and/or tonne-kilometer, and also reducing $CO_2$ production per seat-kilometer and/or tonne-kilometer. The challenge of optimizing the use of available fuselage volume is complicated by the need to provide for passenger comfort and safety while accommodating associated cargo requirements. Finally, passenger cabin layout and design must take into consideration the need for crash landing energy absorption in lower areas of the fuselage.

Two approaches that have been used in the past to increase passenger capacity of existing aircraft are to stretch the aircraft body, or increase the passenger abreast count. The former approach can keep the ratio of the passenger seat count and cargo capacity roughly the same, but can also change aircraft takeoff and landing parameters, and sometimes involves a redesign of aircraft wings and/or the use of different engines. The latter approach can involve the use of narrower aircraft seats and/or local carving of body frames inboard. Unfortunately, this approach generally reduces passenger comfort, and can involve significant redesign of aircraft structural components.

Accordingly, there is a need for an aircraft fuselage that optimizes use of fuselage volume while increasing passenger capacity and satisfying the need for passenger safety and comfort with adequate cargo storage. The disclosed embodiments are intended to address one or more of the above issues.

SUMMARY

The disclosed embodiments provide a fuselage design and cabin layout that optimizes use of the fuselage volume while satisfying the need for crash worthiness and cargo carrying requirements. A split level cabin floor layout within a fuselage of uniform cross section provides maximum passenger seating capacity. Cargo decks beneath passenger seating areas provide crushable zones that absorb energy during crash landings in order to protect passengers. The split level cabin layout includes upper and lower stacked cabins connected to an intermediate level main cabin through one or more sets of stairs, elevators or escalators. In one embodiment, a second set of stairs allows passengers to traverse between the upper and lower cabins without passing through the main cabin. Stairs connecting the main cabin to the upper and lower cabins may be longitudinally spaced, as required, to accommodate underlying cargo bays and/or landing gear wheel wells. In another embodiment, space above the main cabin is utilized as a rest compartment for crews that is accessible by stairs or ladders. In some embodiments, where the lower cabin is near the waterline of the aircraft, split "dutch" doors in the fuselage provide passenger egress while protecting against the inflow of water into the cabin in the event of an emergency water landing.

According to one disclosed embodiment, an aircraft comprises a fuselage, a first cabin, a split level cabin longitudinally spaced from the first cabin and a lower hold. The split level cabin includes an upper second cabin and a lower third cabin. The lower hold is beneath at least a portion of the lower third cabin. The first cabin has a first floor and the second cabin has a second floor that is above the level of the first floor. The third cabin has a third floor below the level of the first floor. In one example, the second and third cabins are located forward of the first cabin, while in another embodiment, the second and third cabins are located aft the first cabin. The aircraft may further comprise means for allowing passengers to traverse between the first cabin and each of the second and third cabins, which may include at least one of stairs, an escalator and an elevator. The aircraft may further comprise a first cargo deck located beneath the first cabin floor. The aircraft may further comprise at least one set of stairs allowing passengers to traverse directly between the second and third cabins without traversing through the first cabin.

According to another embodiment, an aircraft comprises a fuselage, a first cabin having a first floor and a split level cabin longitudinally spaced from the first cabin. The split level cabin includes an upper second cabin having a second floor above the first floor and a lower third cabin having a third floor below the level of the first floor. The aircraft further comprises means for allowing passengers and crew to traverse between the first cabin and each of the second and third cabins, and an upper compartment stacked above the first cabin, wherein the upper compartment has a fourth floor above the level of the second floor. Means, such as stairs or a ladder are provided for allowing passengers and crew to traverse between the second cabin and the upper compartment.

According to still another embodiment, an aircraft comprises a fuselage, a first cabin in the fuselage having a first floor, and a split level cabin longitudinally spaced from the first cabin. The split level cabin includes an upper second cabin having a second floor above the level of the first floor, and a lower third cabin beneath the upper second cabin and having a third floor below the level of the first floor. The aircraft further comprises powered transport means for vertically transporting payloads between the first, second and third cabins. The powered transport means may comprise an elevator longitudinally positioned within the fuselage between the first cabin and the split level cabin.

One embodiment of an aircraft comprises a fuselage, a first passenger cabin having a first floor, and a split level cabin located in the fuselage forward of the first passenger cabin. The split level cabin includes an upper second cabin having a second floor above the level of the first floor and a lower third cabin beneath the second upper cabin and having a third floor below the level of the first floor. The aircraft comprises a lower hold compartment located beneath at least a portion of the lower third cabin.

The aircraft may include a first containerized cargo compartment located below at least a portion of the first passenger cabin and the lower hold compartment may include a systems equipment compartment, a bulk cargo compartment, and a second containerized cargo compartment that has a cross-sectional area that is smaller than the cross-sectional area of the first containerized cargo compartment. The upper second cabin, the lower third cabin, and the lower hold compartment may be vertically stacked within the fuselage.

The aircraft may include a first structure that permits passenger movement between the first cabin and each of the upper second cabin and the lower third cabin. The first structure may be a set of stairs, an escalator, a ramp, or an elevator. The first structure may be a first set of stairs at an interface between the first cabin and the upper second and lower third cabins. The aircraft may include a second set of stairs that permits passenger movement between the upper second cabin and the lower third cabin. The second structure may permit crew movement between a cockpit and at least one of the upper second cabin and the lower third cabin. The second structure may be a set of stairs, a ladder, or an elevator. The aircraft may include a landing adjacent to the cockpit and adjacent to a flight deck bulkhead and the second structure may permit movement between the landing and the upper second cabin or the lower third cabin. The aircraft may include a flight crew compartment located substantially at the level of one of the cockpit, the upper second cabin, or the lower third cabin.

A first portion of the fuselage that is substantially adjacent to the second upper and third lower cabins may have a substantially first cross sectional shape along a length of the first portion and a second portion that is substantially adjacent to the first cabin may have a substantially second cross sectional shape along a length of the second portion, the first cross sectional shape may be larger than the second cross sectional shape. A first portion of the fuselage that is substantially adjacent to the second upper and third lower cabins may have a substantially first cross sectional shape along a length of the first portion and a second portion that is substantially adjacent to the first cabin may have a substantially second cross sectional shape along a length of the second portion, the first cross sectional shape may have a lowered keel line relative to the second cross sectional shape. An aft portion of the lowered keel line of the first portion of the fuselage may be aerodynamically faired into an adjacent region of a wing-to-body fairing with a keel line that is no higher than the lowered keel line of the first portion of the fuselage.

The aircraft may include a crushable zone within the fuselage beneath the lower third cabin for absorbing energy of an impact of the fuselage with the ground during a crash landing. The fuselage may include a keel and the crushable zone may be at least 30 inches of vertical height between the third floor and the keel including the lower hold compartment. A portion of the first floor may be positioned above a main landing gear wheel well and a portion of the third floor may be positioned above a nose landing gear wheel well, the nose landing gear wheel well may comprise a bulkhead that inhibits the nose landing gear from penetrating the lower third cabin under failure conditions of the nose landing gear. A portion of the first floor may be positioned above a wing center section structure, which wing center section structure is positioned forward of the main landing gear wheel well. The aircraft may include a powered transport means for vertically transporting at least one of a galley cart and a person between the first, second, and third cabins at a location forward of the wing center section structure. The aircraft may include a rest compartment located above the first cabin with access means including step means and transit passage means for cabin crew to enter the rest compartment from at least one of the first cabin and the upper second cabin.

The aircraft may include at least a first door in the fuselage at the level of the first cabin to enable egress of one of passengers and cargo from the first cabin. The aircraft may include at least a second door in the fuselage at the level of the second cabin to enable egress of one of passengers and cargo from the second cabin. The aircraft may include at least a third door in the fuselage at the level of the third cabin to enable egress of one of passengers and cargo from the third cabin. The aircraft may include at least a fourth door in the fuselage at the level of the lower hold compartment to enable at least one of loading cargo and providing aircraft systems servicing access into the lower hold compartment.

One embodiment is a modified commercial aircraft comprising a crown section that is substantially identical to a crown section of a base aircraft and an aft fuselage that is substantially identical to the base aircraft, having a first cabin with a first floor level. The modified commercial aircraft comprises a forward fuselage portion having a lowered keel in comparison to the base aircraft and a forward split level cabin within the forward fuselage portion, including an upper second cabin having a second floor above the level of the first floor and a lower third cabin beneath the upper second cabin, the lower third cabin having a third floor below the level of the first floor. The modified commercial aircraft comprises a forward cargo deck within the lowered forward portion of the fuselage beneath at least a portion of the lower third cabin. The modified aircraft has a passenger capacity that is greater than a passenger capacity of the base aircraft and a cargo capacity that is less than a cargo capacity of the base aircraft.

The modified aircraft may include a modified fairing on a belly of the fuselage, the modified fairing may define a transition between the lowered keel of the forward fuselage portion and the keel of the aft fuselage portion. The upper second cabin, the lower third cabin, and the forward cargo deck may be vertically stacked within the fuselage. The modified aircraft may include a first structure that permits passenger movement between the first cabin and each of the upper second cabin and the lower third cabin.

One embodiment is a method for reconfiguring a base aircraft into a derivative aircraft configuration, the base aircraft comprising a fuselage, including a crown section and a keel, a first cabin, having a first floor at a substantially constant level within an aft portion of the fuselage, an aft cargo deck location below the first floor, and a base passenger capacity, a base cargo capacity, a maximum takeoff weight, and a flight surface geometry. The method comprises lowering a forward portion of the keel while keeping the crown section substantially constant fore-to-aft and providing a split level cabin within a forward portion of the fuselage, the split level cabin including an upper second cabin having a second floor above the level of the first floor, and a lower third cabin beneath the upper second cabin and having a third floor below the level of the first floor. The method comprises providing a forward cargo deck within the lowered aft portion of the fuselage beneath at least a portion of the lower third cabin. The derivative aircraft configuration has a passenger capacity that is greater than the base aircraft passenger capacity and a cargo capacity that is less than the base aircraft cargo capacity.

The method may include providing an aerodynamic fairing transitioning between the keel of the aft portion of the fuselage and the lowered keel of the forward portion of the fuselage. The method may include providing a structure that permits movement between the upper second cabin, the lower third cabin, and the first cabin. Lowering the forward portion of the keel of the derivative aircraft configuration may enable a lowered location for a nose landing gear trunnion and a shorter landing gear strut than for the base aircraft.

Other features, benefits and advantages of the disclosed embodiments will become apparent from the following description of embodiments, when viewed in accordance with the attached drawings and appended claims.

BRIEF DESCRIPTION OF THE ILLUSTRATIONS

FIG. 1 is an illustration of a perspective view of a typical aircraft having a fuselage employing a split level cabin configuration according to the disclosed embodiments.

FIG. 2 is an illustration of a side view of the aircraft shown in FIG. 1, partially in section with the wings and tail assembly removed for clarity.

FIG. 3 is an illustration of a sectional view taken along the line 3-3 in FIG. 2.

FIG. 4 is an illustration similar to FIG. 2 but showing an alternate embodiment of the split level cabin layout.

FIG. 5 is an illustration of a sectional view taken along the line 5-5 in FIG. 4.

FIG. 15 is an illustration of a plan view of an aircraft having split level which includes the overhead crew rest area shown in FIG. 14.

FIGS. 16A-16C are illustrations of diagrammatic side views of an aircraft having split level cabins employing an elevator.

FIG. 17 is an illustration of a side view of the rear portion of an aircraft having split level cabins, showing the waterline of the aircraft and the use of horizontally divided doors in the lower cabin.

Figure 6:
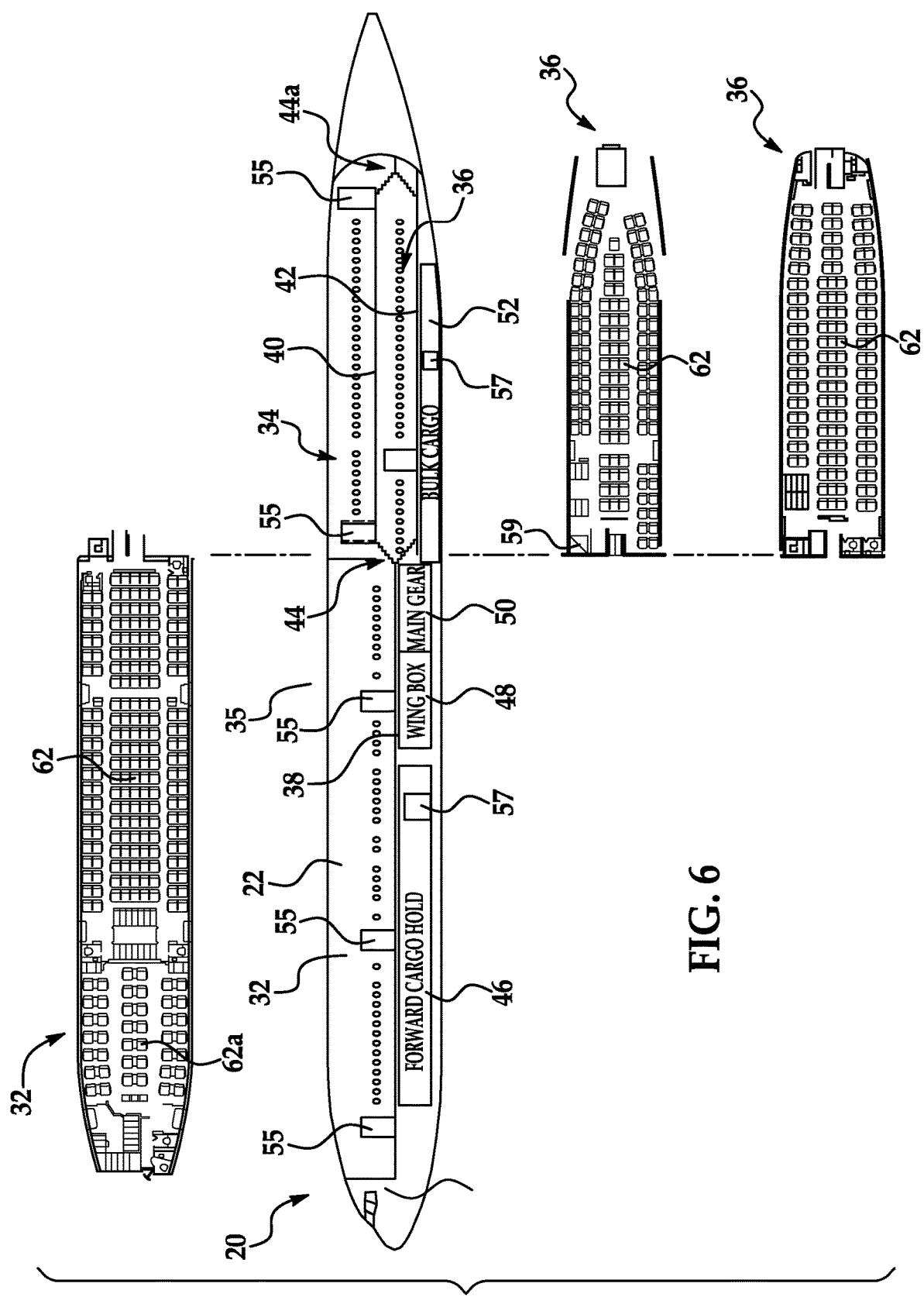
FIG. 6 is an illustration similar to FIG. 2 but showing alternate embodiments of connecting stairs and seat layouts for each of the cabins.

While the disclosure is susceptible to various modifications and alternative forms, specific embodiments have been shown by way of example in the drawings and will be described in detail herein. However, it should be understood that the disclosure is not intended to be limited to the particular forms disclosed. Rather, the intention is to cover all modifications, equivalents and alternatives falling within the scope of the disclosure as defined by the appended claims.

DETAILED DESCRIPTION

Referring first to FIGS. 1-3, an aircraft 20 comprises a generally cylindrical fuselage 22 having an attached wing assembly 26 and a tail assembly 28. In the illustrated example, the aircraft 20 is propelled by jet engines 30 mounted on the wing assembly 26, as best seen in FIG. 1. The aircraft 20 may carry any of various types of payloads, including cargo and passengers. As used herein, the term "passengers" is intended to include all forms of passengers including crews, pilots, attendants and service personnel.

Referring now particularly to FIGS. 2 and 3, the fuselage 22 broadly includes a forwardly positioned crew cockpit 24 and a split level cabin layout 35 comprising a first, main level cabin 32 positioned immediately aft of the cockpit 24, and upper and lower, second and third cabins 34, 36 positioned between the main cabin 32 and the tail assembly 28 (FIG. 1). Cabins 32, 34 and 36 respectively include cabin floors 38, 40 and 42 for supporting passenger seats 62 and/or cargo.

Although not shown in the figures, each of the floors 38, 40, 42 may have embedded hardware for attaching payloads to the floors 38, 40, 42. For example, one or more of the floors 38, 40, 42 may have multiple seat tracks (not shown) that allow the passenger seats 62 to be attached to the floors 38, 40, 42 in various flexible configurations, and which allow the seats 62 to be removed in order to allow other forms of payloads, such as cargo, to be carried in the cabins 32, 34, 36. The upper cabin floor 40 is positioned above the level of the main cabin floor 38, while the lower cabin floor 42 is positioned below the level of the main cabin floor 38. Cabin floors of different or varying depth may be used to best optimize cabin heights relative to floor structure weight.

The upper and lower cabins 34, 36, are vertically stacked and are respectively are connected with each other, and with the main cabin 32 by two flights of stairs 44 which, in the illustrated example are longitudinally aligned within the fuselage 22. Flights of stairs that are transversely aligned or are aligned at an angle or are curved/nonlinear are also possible in variant embodiments. Stairs 44 provide a means of allowing passengers to traverse between cabins 32, 34 and 36. The number of stairs in each flight thereof may be the same or different. In those embodiments where the two flights have a different number of stairs 44, the upper and lower cabin floors 40, 42 respectively, will be at different heights relative to the main cabin floor 38.

In typical embodiments, the upper floor 40 may be displaced between 5 and 75 inches above the level of the first cabin floor 38, and each of the flights of stairs 44 may comprise between 1 and 15 stairs. Varying values of step rise and step length and step overhang are possible for variant embodiments. Similarly, the lower floor 42 may be displaced between 5 and 75 inches below the level of the first cabin floor 38, and the stairs connecting the first main cabin 32 with the lower aft cabin 36 may comprise between 1 and 15 stairs. Although not shown in FIGS. 2 and 3, an elevator, escalator or other means of transporting passengers between the floors 38, 40, 42 are possible. Similarly, although not shown in FIGS. 2 and 3, galley cart lift(s) may be provided as means for transporting galley carts such as galley carts and beverage carts between the floors 38, 40 and 42. In the illustrated example, doors 55 are provided in cabins 34 and 36 to allow emergency passenger egress and/or servicing of the cabins.

A first cargo deck comprising a first forward cargo deck or hold 46 is disposed beneath the main cabin floor 38. The forward cargo deck 46 has a volume partially defined by a height $h_1$ that will permit carrying standardized, full size LD-3 cargo containers as well as pallets and/or bulk cargo. The forward cargo deck 46 can be loaded with the cargo containers or pallets via a cargo door (not shown) on either the right or left side of the fuselage, as is well known in the art. A center wing box 48 and main landing gear wheel well 50 are positioned immediately aft of the forward cargo deck 46, beneath the main cabin floor 48. The wing box 48 forms part of a structure that mounts the wing assembly 26 (FIG. 1) on the fuselage 22. A lower aft hold 52 which may comprise an aft cargo hold or deck is positioned immediately aft of the main landing gear well 50, beneath the lower cabin floor 42. The lower hold 52 may include a door 57 allowing loading/unloading of cargo and has a height $h_2$ that may be less than the height $h_1$ of the forward cargo deck 46. While the door 57 is shown on the left side of the airplane fuselage, in alternate airplane configurations the door 57 may alternatively be located on the right side of the airplane.

The reduced height $h_2$ of the lower hold 52 accommodates the height required for the stacked aft cabins 34, 36, while still providing sufficient volume to accommodate smaller cargo, including bulk cargo, as well as some reduced height unit cargo devices from a set including LD3-45, LD3-45W, LD3-46, LD3-46W cargo container, and other containers between 20 and 60 inches in height. In alternate embodiments the lower aft hold 52 may comprise a reduced height volume that is adapted to accommodate selected airplane systems (including but not limited to line-replaceable-units or LRUs, avionics systems, flight controls systems, environmental control systems, entertainment systems, sensor systems, water systems, waste systems, electrical systems, hydraulic systems, pneumatic systems, oxygen systems, fire suppression systems, and/or auxiliary power systems), rather than bulk cargo or unit cargo devices.

A typical reduced height door 57 that would accommodate reduced height LD3-45 containers may have a height of approximately 49 inches and a width of approximately 65 inches. In contrast, a typical full height cargo pallet door 57 in the forward cargo deck 46 may have a height of approximately 69 inches and a width of approximately 105 inches.

FIG. 3 illustrates a typical seating layout wherein the lower cabin 36 is provided with 8-abreast twin-aisle seating and the upper cabin 34 is provided with 6-abreast single-aisle seating. Seats 62 in the upper cabin 34 are supported on and attached to the upper cabin floor 40, while seats 62 in the lower cabin 36 are attached to and supported on the lower cabin floor 42, using seat tracks (not shown) or other known methods of attaching seats to floors on aircraft. Seat tracks can be provided for permitting varying numbers of seats abreast with different seat sizes. For example if the illustrated 8-abreast twin-aisle seating in the lower cabin 36 has representative seat bottom widths of 18.5 inches, corresponding to a high-comfort economy class, alternate seating arrangements could be selectable options such as 9-abreast basic economy-class seats at 17 inches seat bottom width, or 7-abreast high-width business class seats or 6-abreast very-high-width first class sleeper seats or private modules.

Both the upper and lower cabins 34, 36 have a height sufficient to allow normal passenger standing and traversal. For example, these cabins may have aisleway maximum headroom of approximately 80 inches or greater to meet typical widebody aircraft standards, or at least approximately 72 inches or greater to meet minimum standards for small transport aircraft. The upper cabin 34 includes overhead storage bins 64 as well as side storage bins 66. Similarly, the lower cabin 36 includes overhead storage bins 68. Stowage bins may be shelf bins, pivot bins, translating bins or other stowage bin types known in the art. As mentioned above, the lower aft hold 52 may comprise an aft cargo deck beneath the lower cabin floor 42 which may accommodate reduced height cargo containers 56, as well as bulk cargo. The volume of the fuselage 22 below the lower cabin floor 42 which contains the aft cargo deck 52 may include various framework, such as stanchions 58 which both support the lower cabin floor 42 and aid in absorbing impact energy within a crushable zone 60 at the bottom of the fuselage 22 during a crash landing. Preferably, the fuselage 22 includes at least approximately 30 vertical inches of lower fuselage structure between the upper surface of the lower cabin floor 42 and the lower keel surface 65 of the fuselage 22.

The fuselage 22 will also accommodate systems (not shown) such as heating, ventilation and air conditioning systems, lighting systems, passenger service units and emergency systems, routing space for items such as electrical wiring, avionics and flight controls, control systems, hydraulic and/or pneumatic tubing, and a variety of payloads features and amenities such as seats, windows, lavatories, galleys, stowage etc.

In the example illustrated in FIGS. 1-3 the skin covered frame 54 that forms the cross sectional shape of the fuselage 22 is substantially circular, however, other cross sectional shapes such as an oval or piecewise-circular or other non-circular cross-sectional shapes are possible as well. The illustrated fuselage 22 has a main central body or section 39 that is of generally uniform cross section throughout its length, and tapered ends or sections 39, 41 that have a reduced diameter cross section. The cabins 32, 34, 36 are largely contained within the main body section 37 but may include portions that extend into the tapered ends 39, 41 of the fuselage 22.

FIGS. 4 and 5 illustrate another embodiment of a fuselage 22 having a split level cabin 35 in which the upper and lower stacked cabins 34, 36 are positioned forward in the fuselage 22, between the wing box 48 and the cockpit 24. In this example, the forward cargo deck 46 is of reduced height to accommodate the standing room height required within upper and lower cabins 34 and 36 which are stacked above the forward cargo deck 46. The main cabin 32 is positioned in an aft section of the fuselage 22, above the wing box 48, main landing gear well 50 and aft cargo hold 52, which may be of a height greater than that of the forward cargo deck 46 in order to accommodate full size cargo containers. In this example, an additional cargo hold 70 behind the aft cargo deck 52 may be possible for storing bulk cargo. The upper and lower cabins 36 are connected with the main aft cabin 32 by means of two flights of stairs 44.

FIG. 5 illustrates one seating layout for the aircraft shown in FIG. 4, in which both the upper and lower cabins 34, 36 are provided with seats 62 arranged in a 7-abreast, twin-aisle configuration. As previously mentioned, the forward cargo deck 46 is of reduced height suitable for carrying bulk storage. Also, similar to the embodiment shown in FIGS. 1-3, the volume of the fuselage 22 beneath the lower cabin floor 42 may include various energy absorbing, reinforcing structures such as stanchions 58 in order to absorb impact energy during a crash landing. It should be noted here that the cross-section configuration shown in FIG. 5 could be combined with the split-level layout of FIG. 2, and the cross-section configuration of FIG. 3 could be combined with the split-level layout of FIG. 4, in further variant embodiments.

Attention is now directed to FIG. 6 which illustrates an aircraft 20 having a fuselage 22 provided with a split level cabin 35 similar to that shown in FIGS. 1-3, but with the provision of an additional set of stairs 44a at the aft end of the fuselage 22 which allows passengers to traverse directly between the upper and lower cabins 34, 36 without traversing the main cabin 32. Thus, passengers may traverse between the upper and lower cabins 34, 36 by using either the forward stairs 44 or the aft stairs 44a. As previously mentioned, it may also be possible to provide one or more elevators (not shown) or escalators (not shown) to allow passengers to traverse between cabins 32, 34 and 36 In this particular example, seating 62 is arranged in a double aisle configuration in cabins 32, 34 and 36. It should be noted here that because the upper and lower aft cabins 34, 36 are located between the wing box 48 and the tail assembly 28 (FIG. 1), emergency passenger egress through doors 55 in the fuselage in both cabin areas is free of obstructions. A cart lift 59 allows carts (not shown) to be vertically transported between floors 42 and 44.

Figure 7:
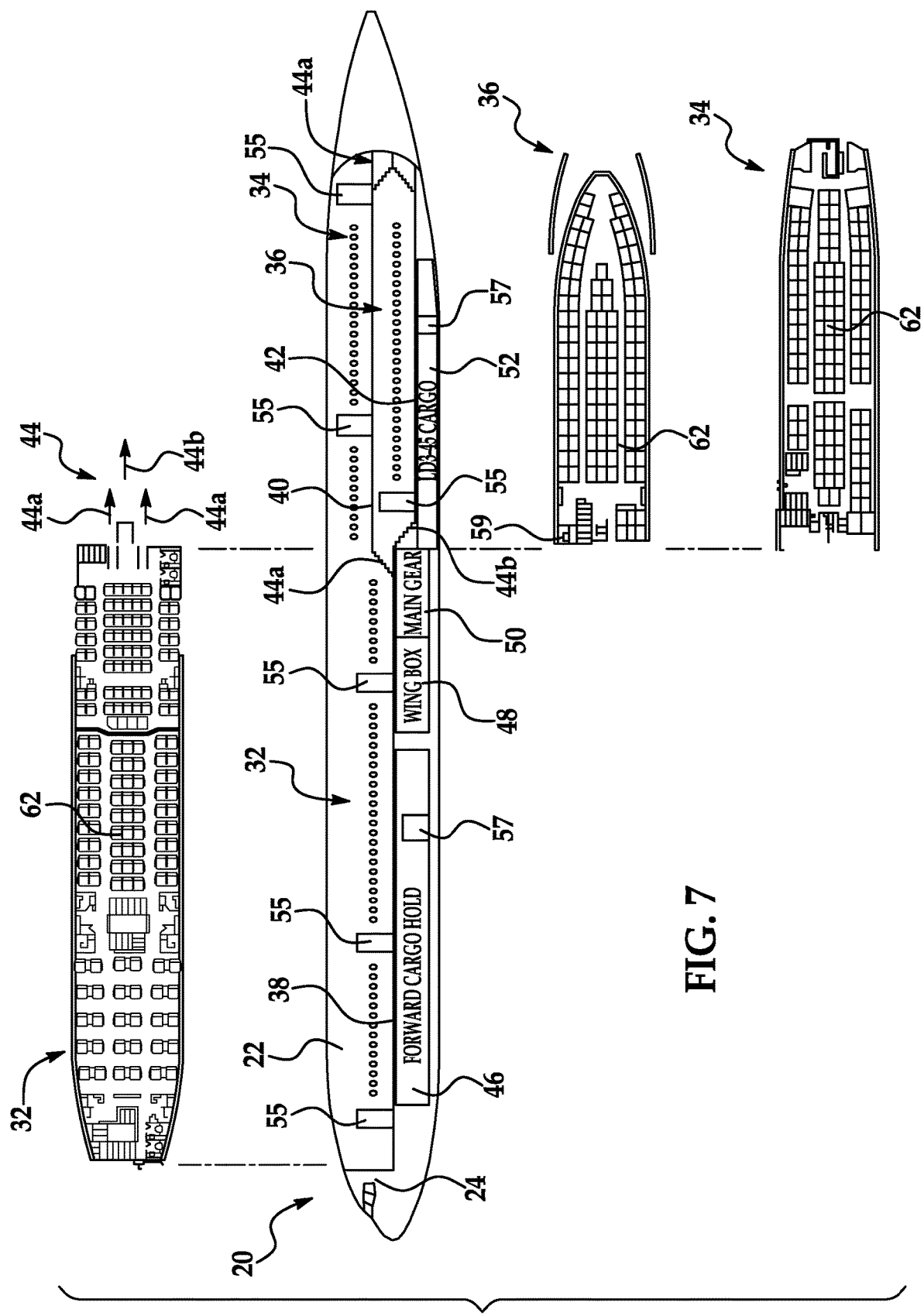
FIG. 7 is an illustration similar to FIG. 2 but showing alternate another embodiment of connecting stairs and seat layouts for each of the cabins.

Attention is now directed to FIG. 7 which illustrates a cabin layout generally similar to that shown in FIG. 6, but wherein the forward stairs 44 connecting the aft upper and lower cabins 34, 36 with the main forward cabin 32 are spaced or staggered relative to each other in the longitudinal direction of the fuselage of the aircraft 20. The forward stairs 44 comprises split, dual up stairs 44a, and extra wide, center down stairs 44b. The configuration shown in FIG. 7 may also include cart lifting means 59 for transporting galley carts between the levels of the cabin floors 38, 40, 42.

Figure 8:
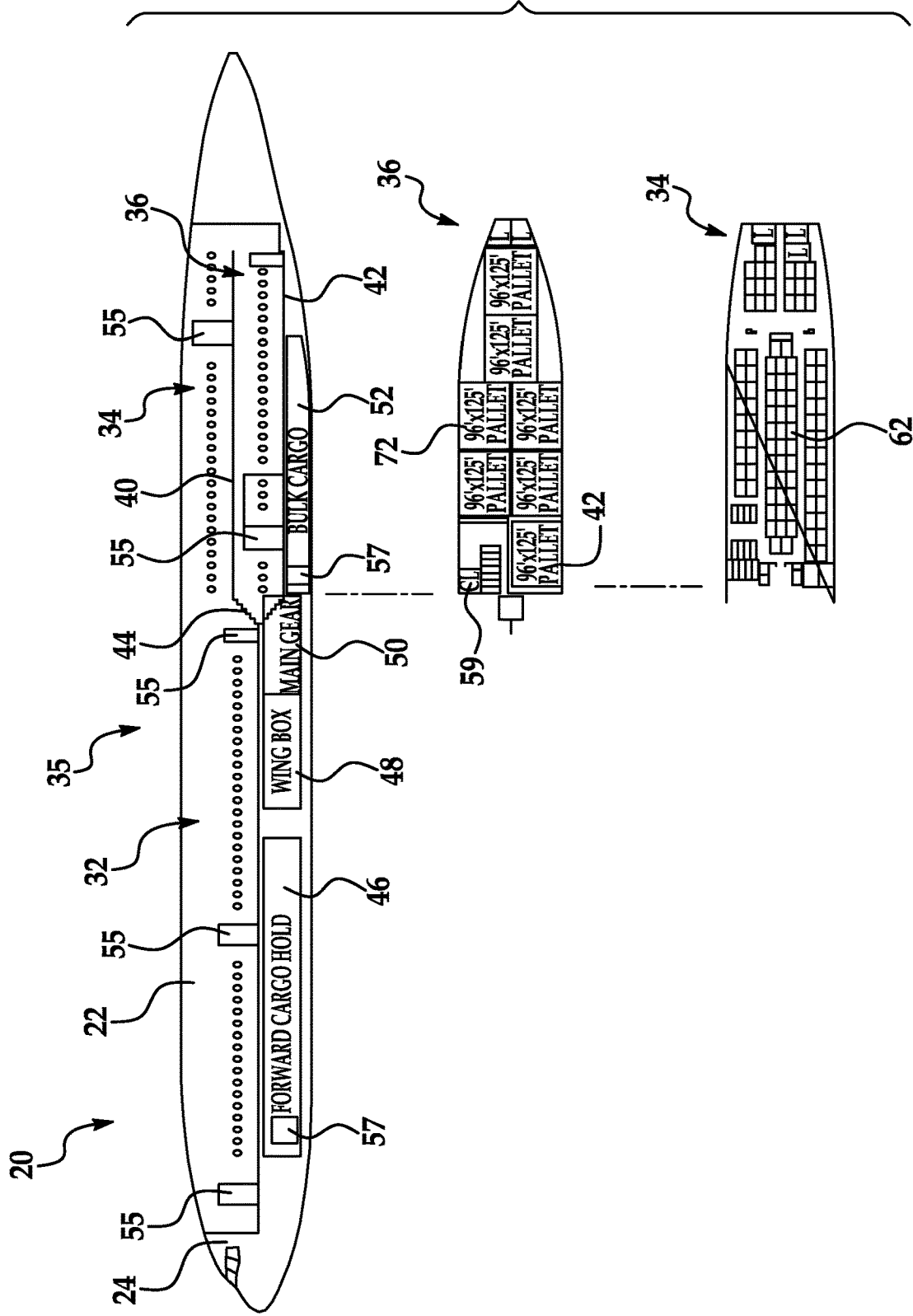
FIG. 8 is an illustration similar to FIG. 2 showing alternate layouts for the upper and lower cabins wherein the lower cabin is employed for cargo.

FIG. 8 illustrates another fuselage layout employing a split level cabin 35, but wherein the lower aft cabin 36 is adapted to carry either passengers or cargo. In this particular example, the lower cabin floor 42 has been adapted to support cargo pallets 72, however floor 42 may be readily adapted to have passenger seats mounted thereon. This flexible configuration allows airline customers to change their mix of passenger and cargo payloads on different routes and missions.

Figure 9:
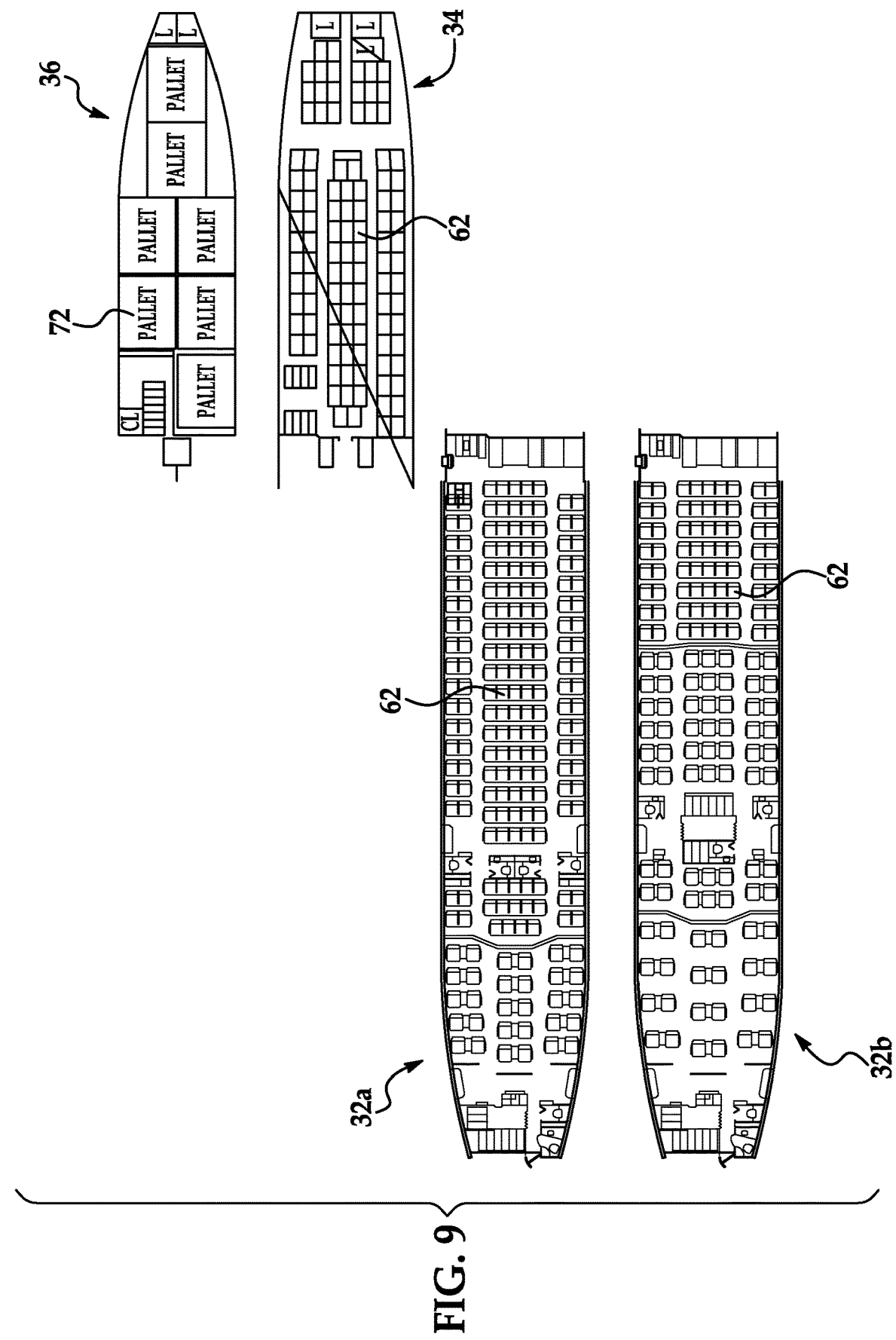
FIG. 9 is an illustration of a plan view of alternate cabin layouts for the aircraft shown in FIG. 8.

FIG. 9 illustrates another embodiment of the layout for the split level cabin where the main level cabin may be provided with a dual class seating arrangement 32a or a tri-class arrangement 32b. In this example, the lower aft deck 36 is adapted for carrying cargo pallets 72, with seven pallets shown but optionally convertible to varying mixes of cargo pallets and passenger seats, separated by an appropriate cargo barrier (not shown).

Figure 10:
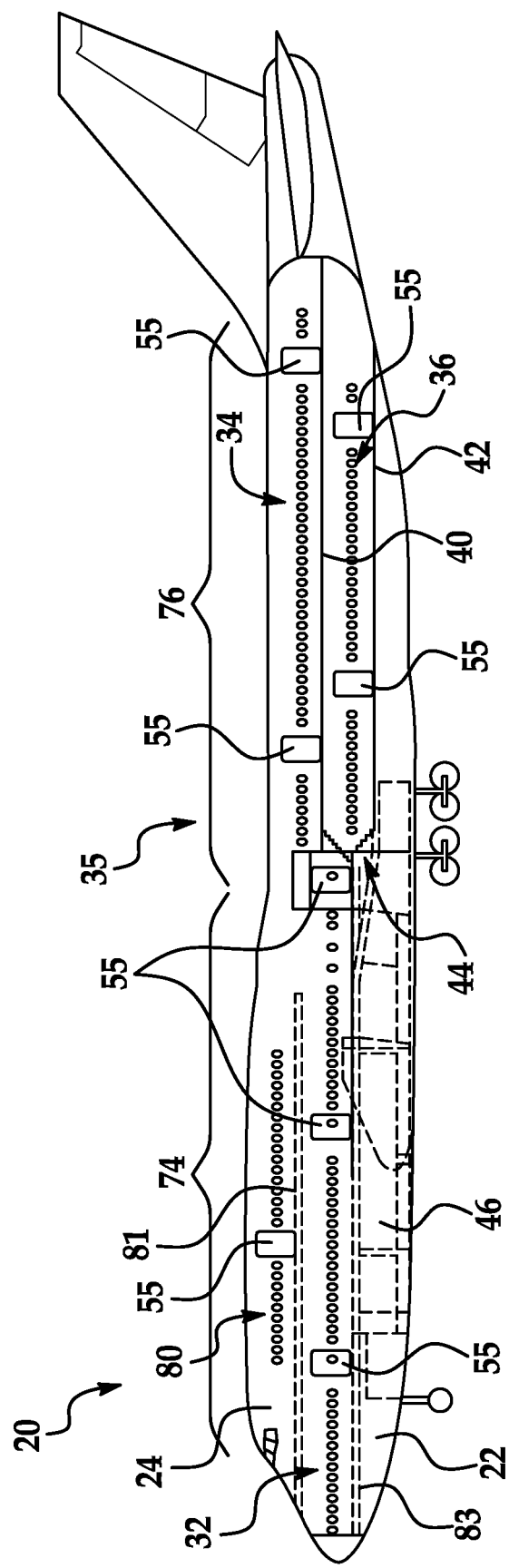
FIG. 10 is an illustration of a side view of a "jumbo" aircraft having the split level cabin of the disclosed embodiments.
Figure 10A:
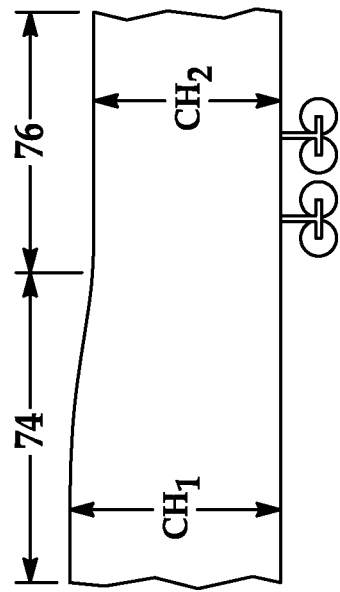
FIG. 10A is an illustration of a side view of a portion of the aircraft depicted in FIG. 10, showing difference in crown height between the fore and aft sections of the fuselage.

FIG. 10 illustrates a so-called "wide body" or "jumbo jet" 20 having a fuselage 22 provided with a double lobe forward section 74 and an aft section 76 that has a reduced cross sectional area shape. The forward section 74 may have a substantially constant cross section along its length and has a crown height $CH_1$ as shown in FIG. 10A. The aft section 76 also may have a substantially uniform cross section along its length and has a crown height $CH_2$ which is less than the crown height $CH_1$. The forward section 74 of the fuselage 22 includes a fourth cabin comprising a forward, upper level cabin 80 positioned aft of the cockpit 24, above a first forward main cabin 32. The forward, upper level cabin 80 has a floor 81, and the forward main cabin 32 has a floor 83. Floors 81, 83 may be connected by a set of stairs (not shown) typically located at the forward end of cabins 32, 80 to allow passengers and/or crews to traverse between these cabins.

The aircraft 20 further includes a split level cabin 35 formed by upper and lower aft stacked cabins 34, 36 in combination with the main forward cabin 32. The upper and lower stacked cabins 34, 36 are located aft of the main forward cabin 32, substantially within the aft section 76 of the fuselage 22 and may include a reduced height aft cargo deck 52 beneath the lower aft cabin 36 which is longitudinally spaced from a forward cargo deck 46 located beneath the main forward cabin 32. In this embodiment, the floor 40 of the upper aft cabin 34 is located above the main forward cabin floor 83, but below the level of the upper forward cabin floor 81. As in previous embodiments, the main forward cabin 32 is connected to the upper and lower aft cabins 34, 36 by a set of stairs 44.

Figure 11:
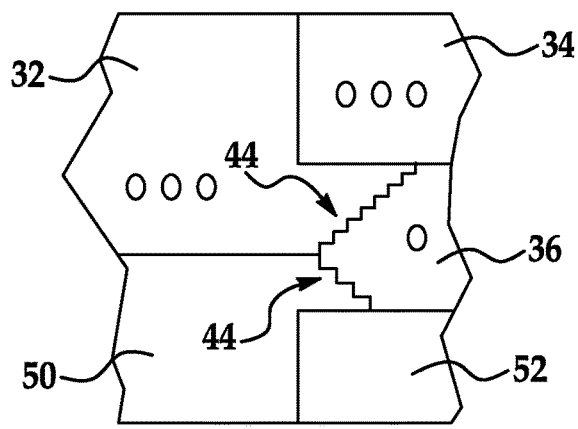
FIG. 11 is an illustration of a diagrammatic side view showing one stair layout for connecting the main cabin with the upper and lower cabins.
Figure 12:
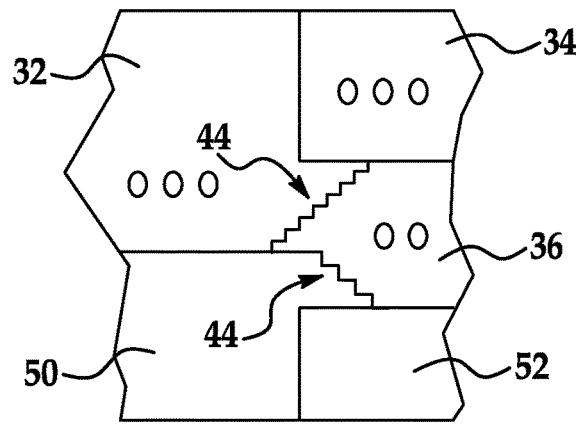
FIG. 12 is an illustration similar to FIG. 11 but showing an alternate stair layout.

FIG. 11 illustrates, on a larger scale, an arrangement of stairs 44 similar to that shown in FIG. 2 in which the two flights of stairs 44 connecting the main cabin 32 with the aft upper and lower cabins 34, 36 are substantially aligned in the longitudinal direction of the aircraft 20. FIG. 12 illustrates a stair layout in which flights of stairs 44 are longitudinally spaced or staggered from each other in order to accommodate varying cabin arrangements, similar to the embodiment shown in FIG. 7.

Figure 13:
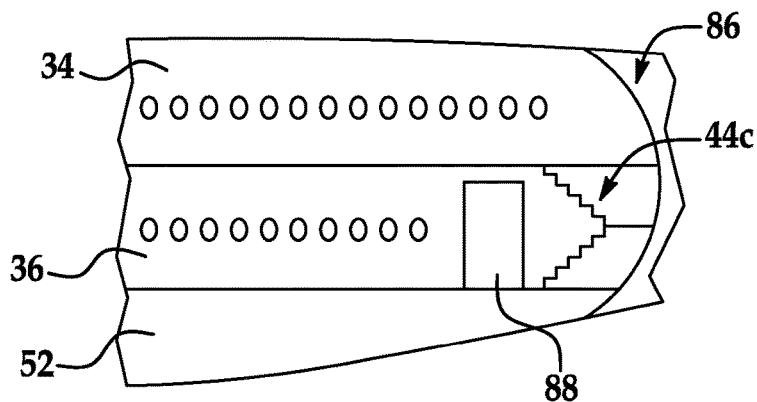
FIG. 13 is an illustration of a diagrammatic, side view of a rear portion of an aircraft that includes a second set of stairs directly connecting the upper and lower cabins.

FIG. 13 illustrates, on a larger scale, the aft flights of stairs 44c adjacent the aft bulkhead 86, which connect the aft upper and lower cabins 34, 36 shown in the embodiments of FIGS. 6 and 7.

Figure 14:
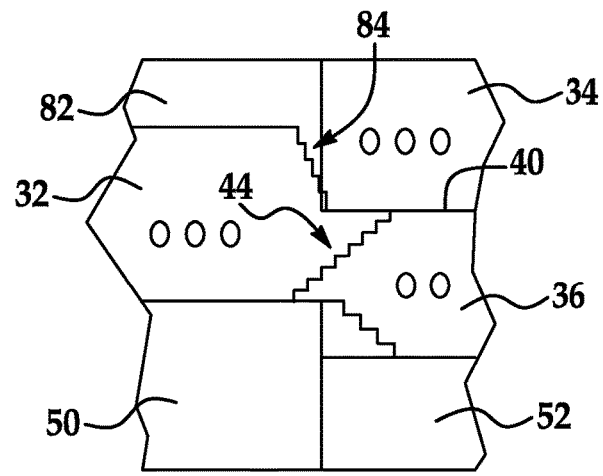
FIG. 14 is an illustration of a diagrammatic view of a fuselage layout that includes a compartment above the main cabin that is accessible from the upper cabin.

FIGS. 14 and 15 illustrate another embodiment of a split level cabin configuration comprising a main forward cabin 32, and upper and lower aft cabins 34, 36 that are connected by stairs 44. In this example, however, an upper compartment 82 is provided above the main cabin 44 which may be used for any of various purposes, such as a rest area for crew use. The upper compartment 82 may be accessed from the upper aft cabin 34 by a set of stairs or ladder 84 which extend between the upper cabin floor 40 and compartment 82. Positioning the crew rest area compartment 82 above the main cabin 32 eliminates the need for a comparable rest area on the main cabin floor 38, thereby freeing up additional space that may be employed for passenger seating. Alternate egress means (not shown) connecting the upper compartment 82 with the main cabin 44 may optionally be provided, for emergency or normal use.

Referring now to FIGS. 16A-16C, as previously mentioned, an elevator or similar transport means 90 may be provided in the aircraft 20 in order to transport passengers, cargo, galley carts, wheelchairs and the like between the cabin floors 38, 40, 42. As shown in FIG. 16A, the elevator 90 is positioned at the level of the upper cabin floor 40, allowing loading/unloading as shown by the arrow 92. In FIG. 16B, the elevator 90 is shown as having descended to the level of the main cabin floor 38 thus transporting passengers, etc. from the upper aft cabin 34 to the main cabin 32. FIG. 16C shows the elevator 90 having descended further to the level of the lower aft cabin floor 42. Alternate elevator or cart lift devices may be configured with two doors (as illustrated) or a single door.

Attention is now directed to FIG. 17 which illustrates a rear portion of an aircraft 20 having a split level cabin 35 according to the disclosed embodiments. In this example, the aircraft 20 has an imaginary waterline 96 which represents the water level on the aircraft 20 in the event it must ditch in a body of water, where the aircraft 20 would float for a period of time. The lower aft cabin 36 may be partially located below the waterline 96. In order to allow emergency egress of passengers, horizontally split doors 94 are provided in the fuselage 22 at the level of the lower cabin 36. Each of the doors 94 includes upper and lower portions 94a, 94b which may be swung open independently of each other. Both portions 94a, 94b may be opened for normal land use. However, when evacuating in water, only the upper portion 94a is opened to allow passengers to climb over the upper sill of the lower portion 94b of the door 94 to evacuate the aircraft 20 onto a raft or slide raft (not shown). The lower door portion 94b which, because it is partially below the waterline 96, remains closed to prevent inflow of water while passengers may exit from the cabin 36 while the upper door portion 94a is open. If slide rafts are used during an evacuation, they may also be deployed over the upper sill of the lower portion 94b. The split doors 94, sometimes referred to as "dutch doors", may be employed with any of the embodiments previously described.

Returning to FIGS. 4 and 5, one embodiment of a fuselage 22 of an aircraft includes a split level cabin 35 in which the upper and lower stacked cabins 34, 36 are positioned forward in the fuselage 22, between the wing box 48 and the cockpit 24. In this embodiment, the forward cargo deck 46 is of reduced height to accommodate the standing room height required within upper and lower cabins 34 and 36 which are stacked above the forward cargo deck 46. The main cabin 32 is positioned in an aft section of the fuselage 22, above the wing box 48, main landing gear well 50 and aft cargo hold 52, which may be of a height greater than that of the forward cargo deck 46 in order to accommodate full size cargo containers. In this example, an additional cargo hold 70 behind the aft cargo deck 52 may be possible for storing bulk cargo. The upper and lower cabins 36 are connected with the main aft cabin 32 by means of two flights of stairs 44.

As discussed above, the lower hold compartment or forward cargo deck 46 is of reduced height with respect to the lower aft cargo hold 52 located below at least a portion of the main cabin 32. The main cabin 32 is positioned in an aft section of the fuselage 22, above the wing box 48, main landing gear well 50 and aft cargo hold 52, which may be of a height greater than that of the forward cargo deck 46 in order to accommodate full size cargo containers. Thus, the lower aft cargo hold may have larger cross-sectional area than the forward cargo deck 46. The lower aft cargo hold 47 having a larger cross-sectional area may be configured to accommodate two-abreast rows of unit load devices (ULDs) side by side, such as 2-LD-3s, 2 LD-2s, or 2LD1s. The forward cargo deck 46 having a smaller cross-section may be configured to accommodate a single file row of ULDs such as LD3-45, LD3-45W, or LD3-46W. The specific ULDs are provided for illustrative purposed only and may be varied as would be appreciated by one of ordinary skill in the art having the benefit of this disclosure.

FIG. 5 illustrates one seating layout for the aircraft shown in FIG. 4, in which both the upper and lower cabins 34, 36 are provided with seats 62 arranged in a 7-abreast, twin-aisle configuration. As previously mentioned, the forward cargo deck 46 is of reduced height suitable for carrying bulk storage. Also, similar to the embodiment shown in FIGS. 1-3, the volume of the fuselage 22 beneath the lower cabin floor 42 may include various energy absorbing, reinforcing structures such as stanchions 58 in order to absorb impact energy during a crash, emergency, or hard landing. U.S. Pat. No. 9,108,719, entitled Aircraft with Aft Split-Level Multi-Deck Fuselage, discloses a split-level aircraft and is incorporated by reference herein in its entirety.

Figure 18:
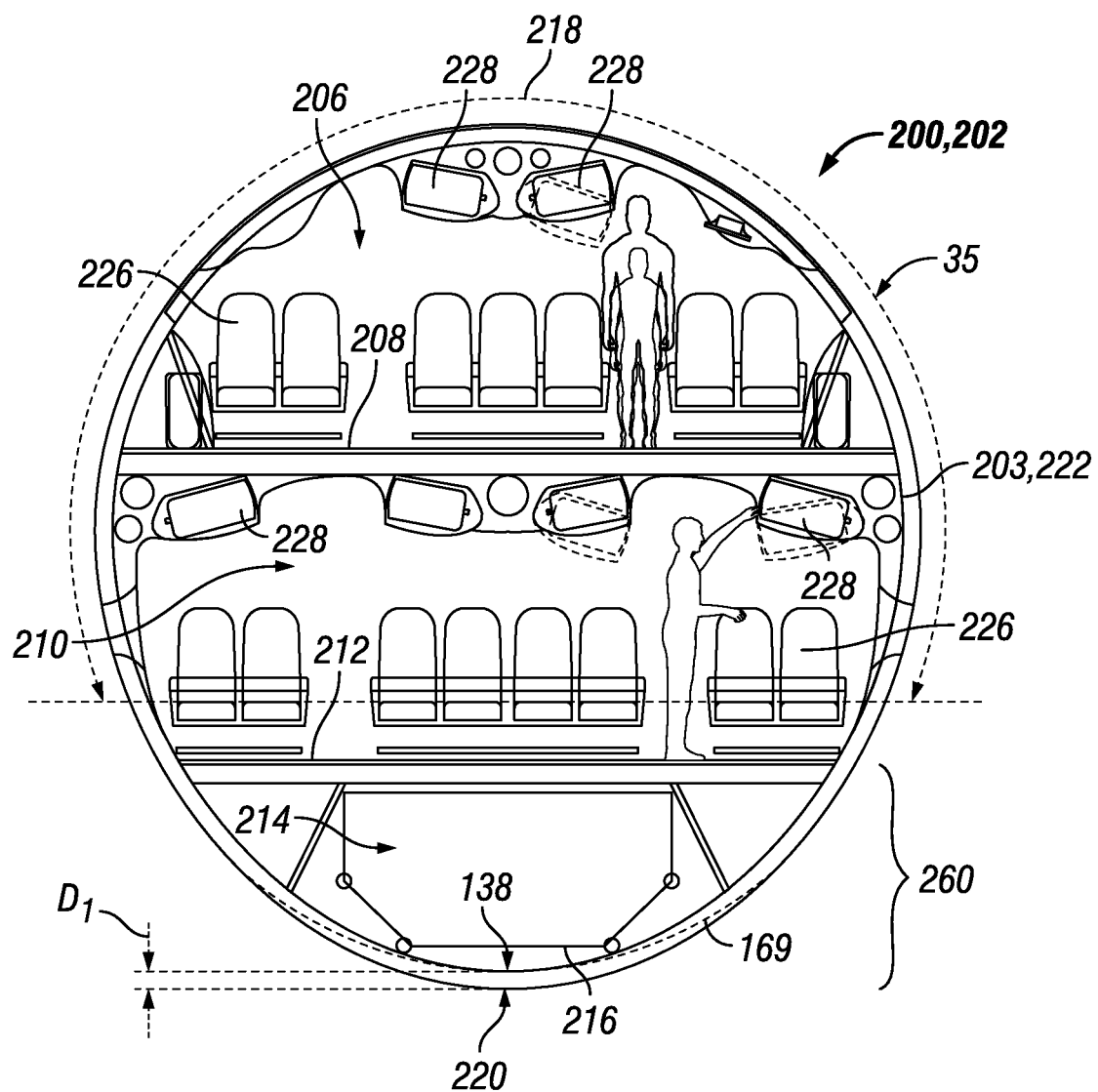
FIG. 18 is a cross-sectional view of one embodiment of a split level forward double deck portion of an aircraft fuselage.

The passenger deck configuration and cargo hold size and shape can vary in split level forward double deck aircraft configured according to this disclosure. Shown in FIG. 18 is a cross-sectional view of another embodiment of a split level forward double deck 202 of an aircraft 200. Though not shown in the view of FIG. 18, the fuselage 222 of the aircraft 200 can include an aft portion 201 (shown in FIG. 20 and FIG. 28) with a main cabin 204 (shown in FIG. 28) and a first or main deck 207 (shown in FIG. 28), and a cargo hold 205 (shown in FIG. 28) beneath at least a portion of the main deck 207. The forward fuselage 203 (best shown in FIG. 20 and FIG. 28) of the aircraft includes an upper second cabin 206 having a second floor 208 above the level of the first floor, and a lower third cabin 210 beneath the upper second cabin 206 and having a third floor 212 below the level of the first floor of the main cabin in the aft portion 201 of the fuselage 222. A second, forward cargo hold or lower hold compartment 214 having a floor or deck 216 is located in the forward fuselage 203 and beneath at least a portion of the lower third cabin 210.

The forward fuselage 203 has a crown section 218 and a lowered keel 220. The base aircraft keel 138 and base aircraft lower outside mold line 169 are shown in FIG. 18, showing the difference in depth $D_1$ of the lowered keel 220 relative to the keel 138 of the base aircraft. It should be appreciated that the difference in depth $D_1$ of the lowered keel 220 relative to the keel 138 of the base aircraft is shown for illustrative purposes only. Many different configurations of a lowered forward keel line aircraft can be made in accordance with the present disclosure as would be appreciated by one of ordinary skill in the art having the benefit of this disclosure. The forward split level aircraft having a forward lowered keel 220 reduces the cargo carrying capacity while increasing the passenger capacity of the aircraft compared to a comparable aircraft having a substantially uniform keel. The lowered forward keel 220 configuration may keep the maximum takeoff weight and aircraft flight characteristics substantially unchanged compared to a base aircraft without the modified lowered forward keel 220.

As shown in FIG. 18, the second 206 and third 210 cabins each include passenger seats 226 and overhead stowage bins 228 for carry-on luggage. The second upper cabin 206 may have passenger seats 226 that are seven-abreast and the lower third cabin 210 may be configured to seat passengers eight-abreast. The aircraft 200 may include a crushable zone 260 within the fuselage 222 beneath the lower third cabin 210 for absorbing energy of an impact of the fuselage 222 with the ground during a crash landing. The fuselage 222 may include a keel 220 and the crushable zone 260 may be at least 30 inches of vertical height between the third floor 212 and the keel 220 including the lower hold compartment 214.

Figure 19:
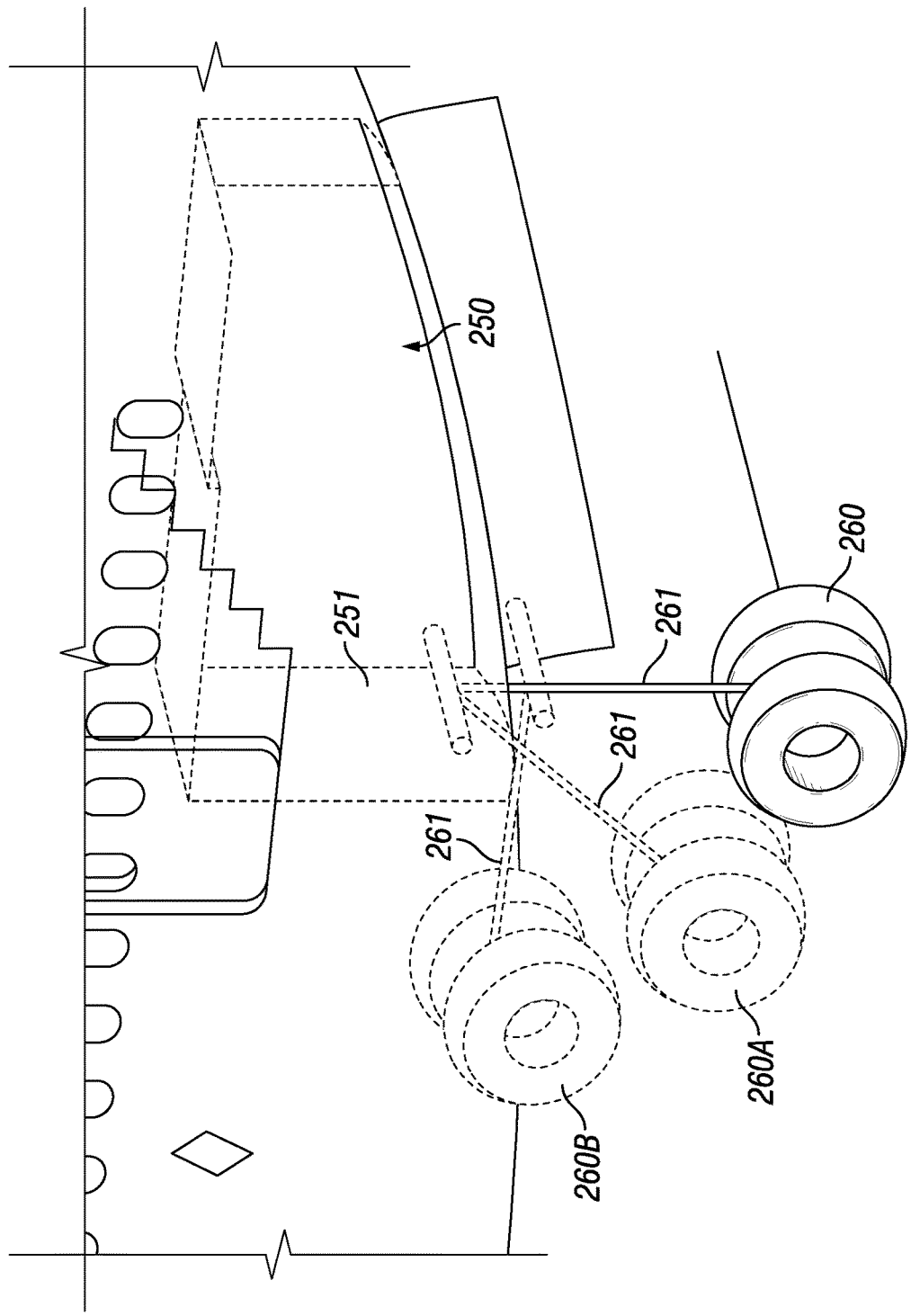
FIG. 19 shows an embodiment of a nose landing gear wheel well.

FIG. 19 shows one embodiment of a nose landing gear wheel well 250. The nose landing gear wheel well 250 is for the nose landing gear that includes wheels 260 and a strut 261. The landing gear wheel well 250 includes a bulkhead 251 that is configured to inhibit the landing gear 260 and 261 from penetrating the passenger compartment in the event of failure upon landing. The forward placement of the landing gear 260 and 261 will cause rearward movement of the landing gear 260 and 261 upon failure. FIG. 19 shows landing gear 260 in rearward positions 260A and 260B. As illustrated in FIG. 19, bulkhead 251 of the landing gear wheel well 250 prevents further upward movement of the landing gear 260 and 261 beyond the position shown as 260B. The bulkhead 251 may inhibit a portion of the landing gear 260 and 261 from penetrating the passenger cabin upon failure during a landing.

Figure 20:
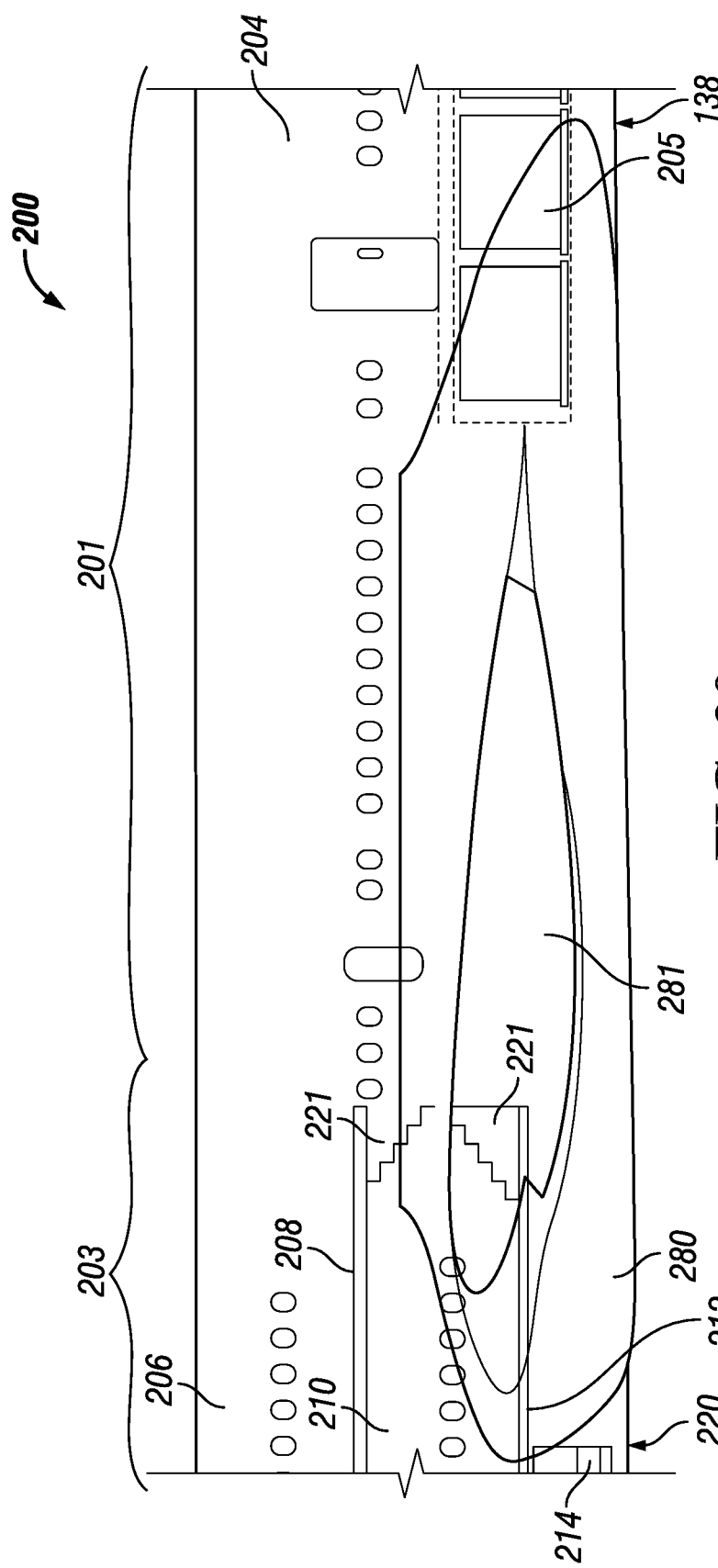
FIG. 20 shows a schematic of portion of a split level forward double deck aircraft having a lowered keel in the forward portion.

FIG. 20 shows a schematic of one embodiment of an aircraft 200 having a split level forward double deck and a forward lowered keel 220 of a forward portion 203 of the aircraft 200 in comparison to the keel 138 of the aft portion 201 of the aircraft 200. An aft portion 201 of the aircraft includes a passenger cabin 204 with a cargo compartment 205 positioned below the passenger cabin 204. A forward portion 203 of the aircraft 200 includes an upper passenger cabin 206, a lower passenger cabin 210 below the upper passenger cabin 206, and a cargo compartment 214 below the lower passenger cabin 210. The floor of the upper passenger cabin 206 is at an elevation above the floor of the passenger cabin 204 of the aft portion 201 of the aircraft 200. The floor of the lower passenger cabin 210 is at an elevation below the floor of the passenger cabin 204 of the aft portion 201 of the aircraft 200.

Figure 21:
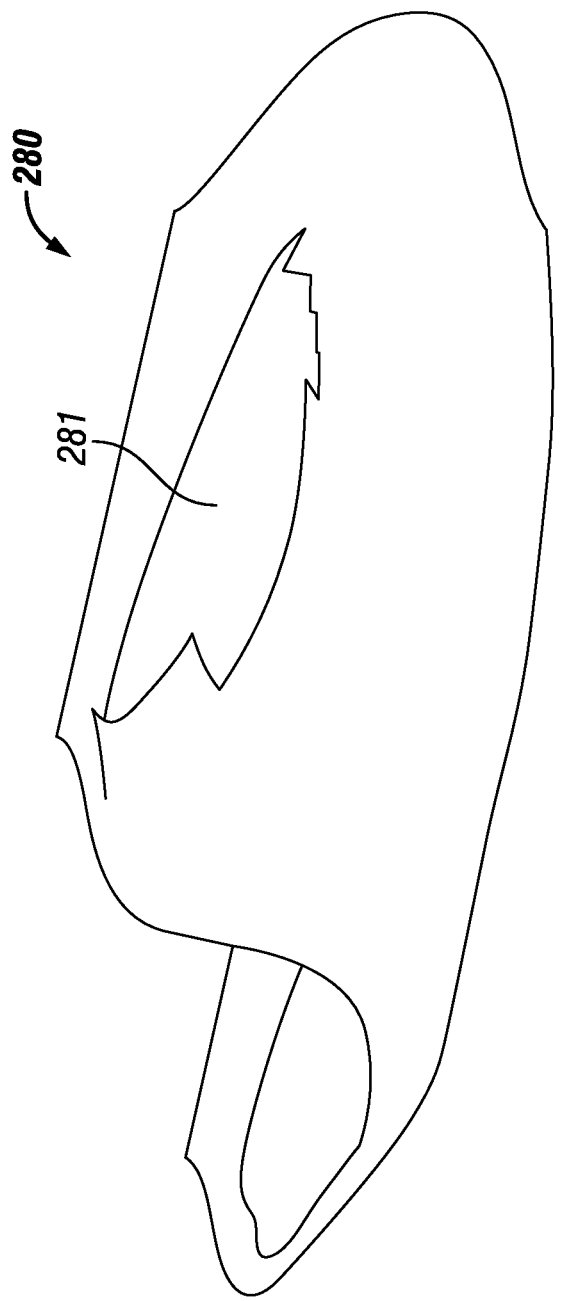
FIG. 21 shows an embodiment of a fairing with a wing box opening.

The forward portion 203 of the aircraft 200 includes a structure 221 that permits movement between the passenger cabin 204 in the aft portion 201 of the aircraft and the upper passenger cabin 206 and lower passenger cabin 210 in the forward portion 203 of the aircraft 200. The structure 221 is depicted as stairs in FIG. 20, but may be other mechanisms and/or structures permitting the traversal between cabins such as a ramp, a ladder, an escalator, or an elevator. The aircraft 200 includes an aerodynamic fairing 280 that includes an opening 281 for the wingbox of the aircraft. The fairing 280 is configured to accommodate the lowered keel 220 of the forward portion 203 with respect to the keel 138 of the aft portion 201 of the aircraft 200. FIG. 21 shows a perspective view of an embodiment of a fairing 280 having an opening 281 for the wingbox that may be used to accommodate the lowered keel 220 with respect to the keel 138 of the aft portion 201 of the aircraft 200.

Figure 22:
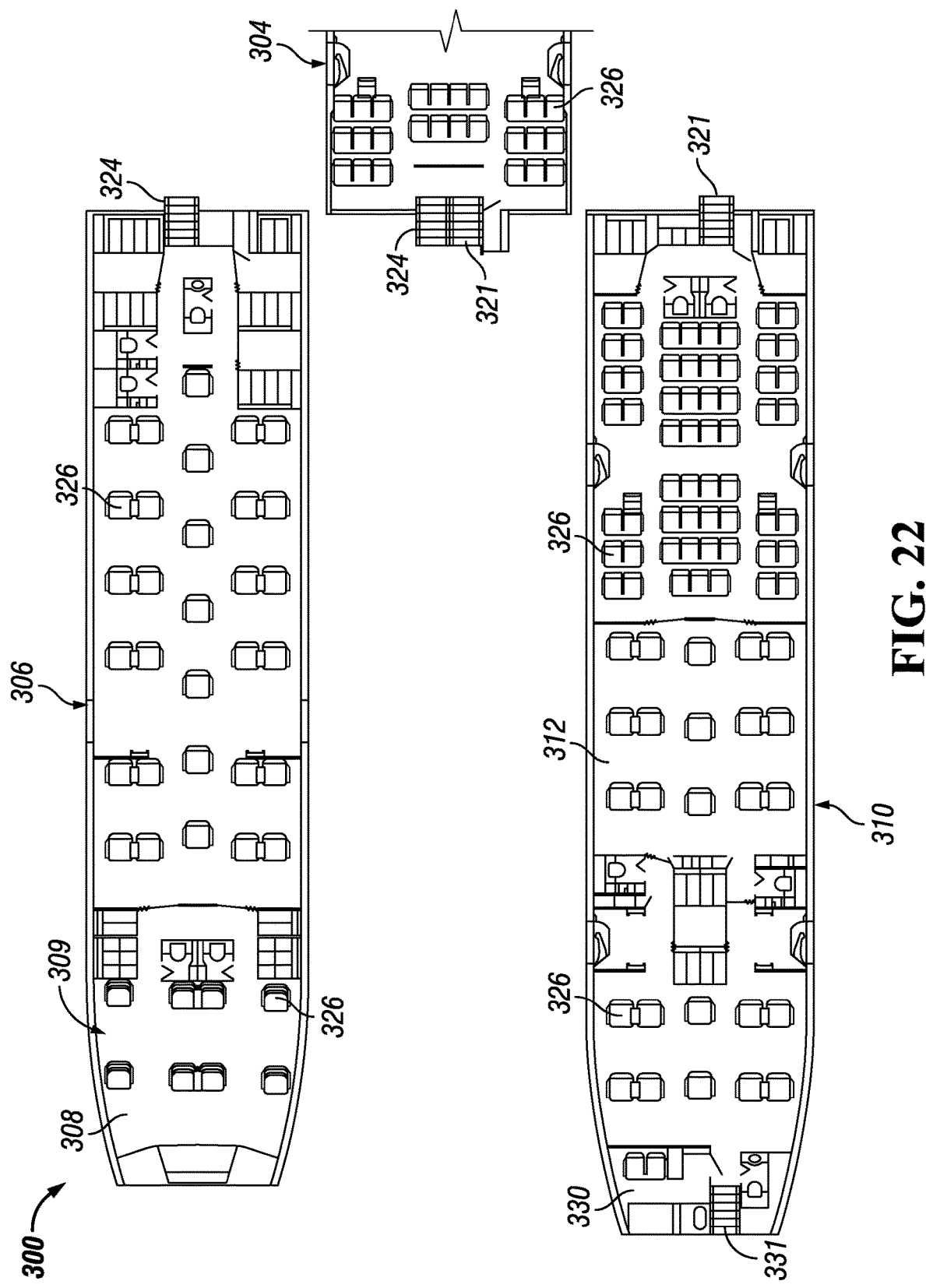
FIG. 22 is a plan view of one embodiment of a cabin layout for a split level forward double deck aircraft.

FIG. 22 is a plan view of one embodiment of a cabin layout 300 for a split level forward double deck aircraft. The cabin layout 300 includes an upper passenger cabin 306 positioned above a lower passenger cabin 310. The upper passenger cabin 306 may include a plurality of passenger seats 326. The forward portion of the upper passenger cabin 306 may include a first class section 309. The floor 308 of the upper passenger cabin 306 may be positioned at a height or elevation above the height or elevation of the floor of the passenger cabin 304 located in an aft portion of the aircraft. The upper passenger cabin 306 includes a structure 324 at an interface between the upper passenger cabin 306 and the passenger cabin 304 of the aft portion of the aircraft that permits traversal between the upper passenger cabin 306 and the passenger cabin 304 of the aft portion of the aircraft. The structure 324 may be a flight of stairs, a ladder, a ramp, an escalator, a lift, or other means as would be appreciated by one of ordinary skill in the art having the benefit of this disclosure.

The lower passenger cabin 310 may include a crew rest area 330 in a forward portion of the cabin 310. The crew rest area 330 may permit access to the cockpit via a ladder or stairs 331 or other structure as would be appreciated by one of ordinary skill in the art having the benefit of this disclosure. The lower passenger cabin 310 may include a plurality of passenger seats 326. The floor 312 of the lower passenger cabin 310 may be positioned at a height or elevation below the height or elevation of the floor of the passenger cabin 304 located in an aft portion of the aircraft. The lower passenger cabin 310 includes a structure 321 at an interface between the lower passenger cabin 310 and the passenger cabin 304 of the aft portion of the aircraft that permits traversal between the lower passenger cabin 310 and the passenger cabin 304 of the aft portion of the aircraft. The structure 321 may be a flight of stairs, a ladder, a ramp, an escalator, a lift, or other means as would be appreciated by one of ordinary skill in the art having the benefit of this disclosure.

Figure 23:
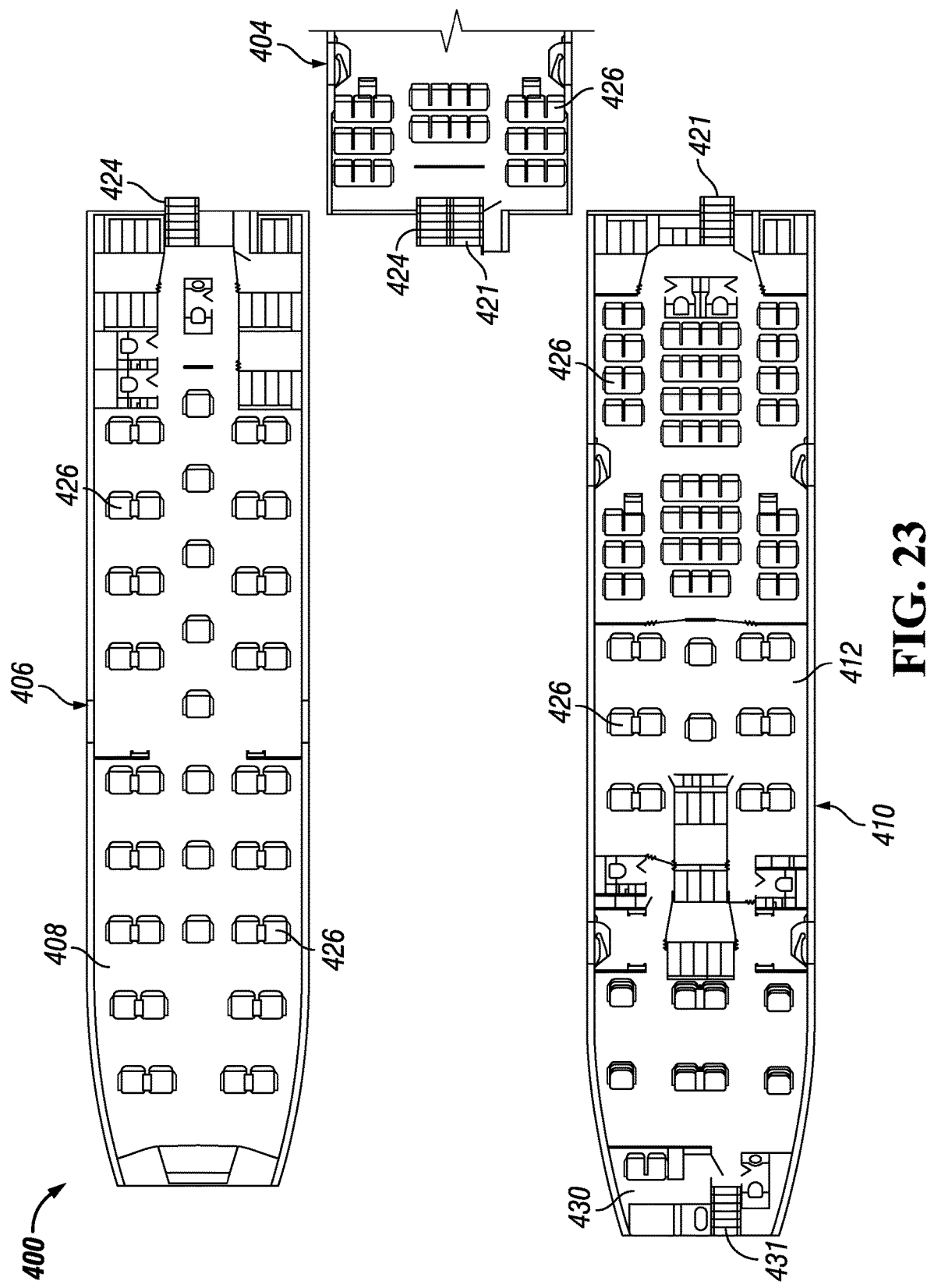
FIG. 23 is a plan view of one embodiment of a cabin layout for a split level forward double deck aircraft.

FIG. 23 is a plan view of one embodiment of a cabin layout 400 for a split level forward double deck aircraft. The cabin layout 400 includes an upper passenger cabin 406 positioned above a lower passenger cabin 410. The upper passenger cabin 406 may include a plurality of passenger seats 426. The floor 408 of the upper passenger cabin 406 may be positioned at a height or elevation above the height or elevation of the floor of the passenger cabin 404 located in an aft portion of the aircraft. The upper passenger cabin 406 includes a structure 424 that permits traversal between the upper passenger cabin 406 and the passenger cabin 404 of the aft portion of the aircraft. The structure 424 may be a flight of stairs, a ladder, a ramp, an escalator, a lift, or other means as would be appreciated by one of ordinary skill in the art having the benefit of this disclosure.

The lower passenger cabin 410 may include a crew rest area 430 in a forward portion of the cabin 410. The crew rest area 430 may permit access to the cockpit via a ladder or stairs 431 or other structure as would be appreciated by one of ordinary skill in the art having the benefit of this disclosure. The lower passenger cabin 410 may include a plurality of passenger seats 426. The floor 412 of the lower passenger cabin 410 may be positioned at a height or elevation below the height or elevation of the floor of the passenger cabin 404 located in an aft portion of the aircraft. The lower passenger cabin 410 includes a structure 421 that permits traversal between the lower passenger cabin 410 and the passenger cabin 404 of the aft portion of the aircraft. The structure 421 may be a flight of stairs, a ladder, a ramp, an escalator, a lift, or other means as would be appreciated by one of ordinary skill in the art having the benefit of this disclosure.

Figure 24:
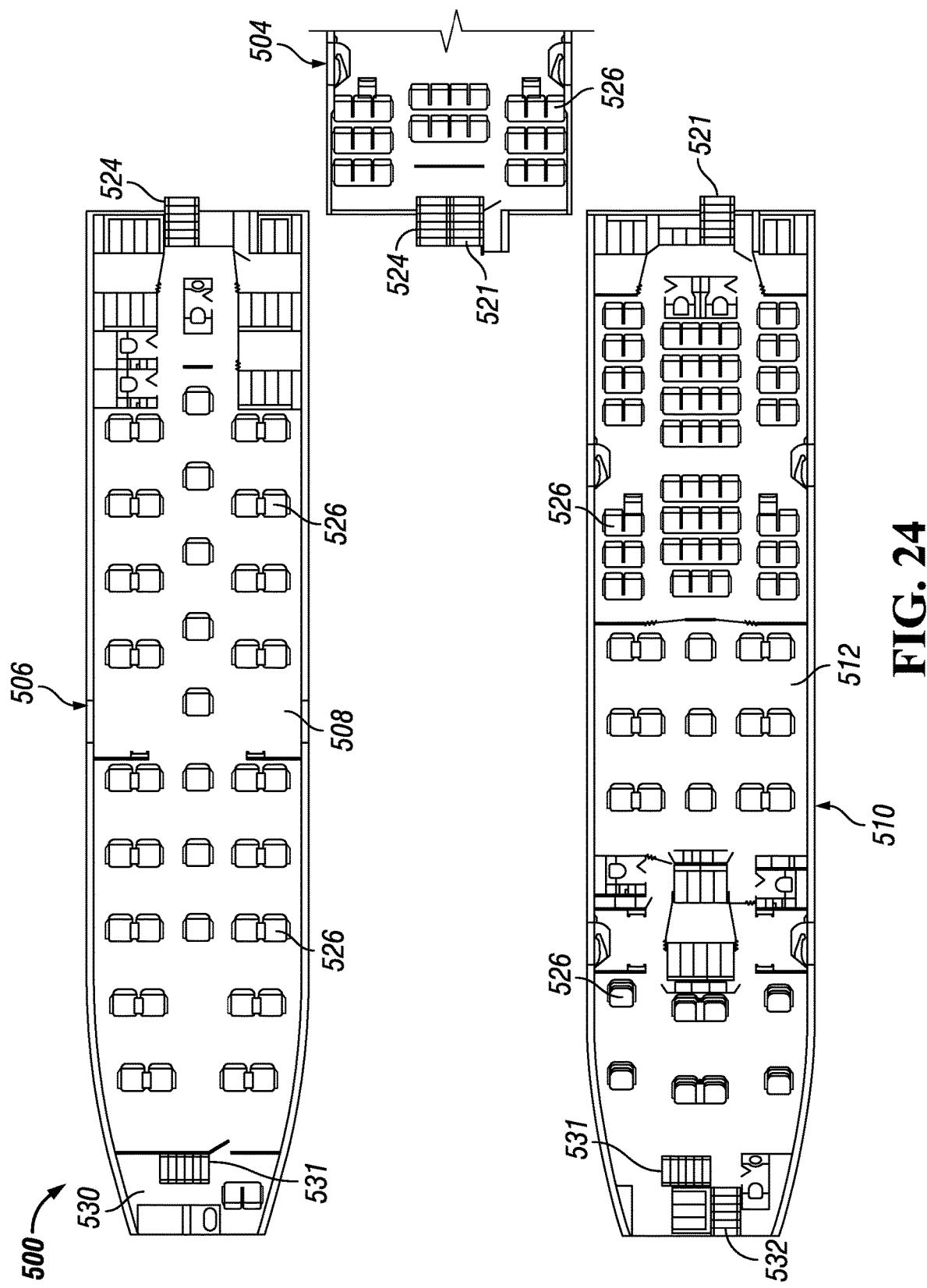
FIG. 24 is a plan view of one embodiment of a cabin layout for a split level forward double deck aircraft.

FIG. 24 is a plan view of one embodiment of a cabin layout 500 for a split level forward double deck aircraft. The cabin layout 500 includes an upper passenger cabin 506 positioned above a lower passenger cabin 510. The upper passenger cabin 506 may include a plurality of passenger seats 526. The forward portion of the upper passenger cabin 506 may include a crew rest area 530. The crew rest area 530 may include a structure 531 that permits traversal between the upper passenger cabin 506 and the lower passenger cabin 510. The floor 508 of the upper passenger cabin 506 may be positioned at a height or elevation above the height or elevation of the floor of the passenger cabin 504 located in an aft portion of the aircraft. The upper passenger cabin 506 includes a structure 524 that permits traversal between the upper passenger cabin 506 and the passenger cabin 504 of the aft portion of the aircraft. The structure 524 may be a flight of stairs, a ladder, an escalator, a ramp, a lift, or other means as would be appreciated by one of ordinary skill in the art having the benefit of this disclosure.

A front portion of the lower passenger cabin 510 may permit access to the cockpit via a ladder or stairs 532 or other structure as would be appreciated by one of ordinary skill in the art having the benefit of this disclosure. A structure 531, which may be a ladder, ramp, flight of stairs, or the like is located at the front portion of the lower passenger cabin 510 that permits traversal between lower passenger cabin 510 and the upper passenger cabin 506. The lower passenger cabin 510 may include a plurality of passenger seats 526. The floor 512 of the lower passenger cabin 510 may be positioned at a height or elevation below the height or elevation of the floor of the passenger cabin 504 located in an aft portion of the aircraft. The lower passenger cabin 510 includes a structure 521 that permits traversal between the lower passenger cabin 510 and the passenger cabin 504 of the aft portion of the aircraft. The structure 521 may be a flight of stairs, a ladder, an escalator, a lift, a ramp, or other means as would be appreciated by one of ordinary skill in the art having the benefit of this disclosure.

Figure 25:
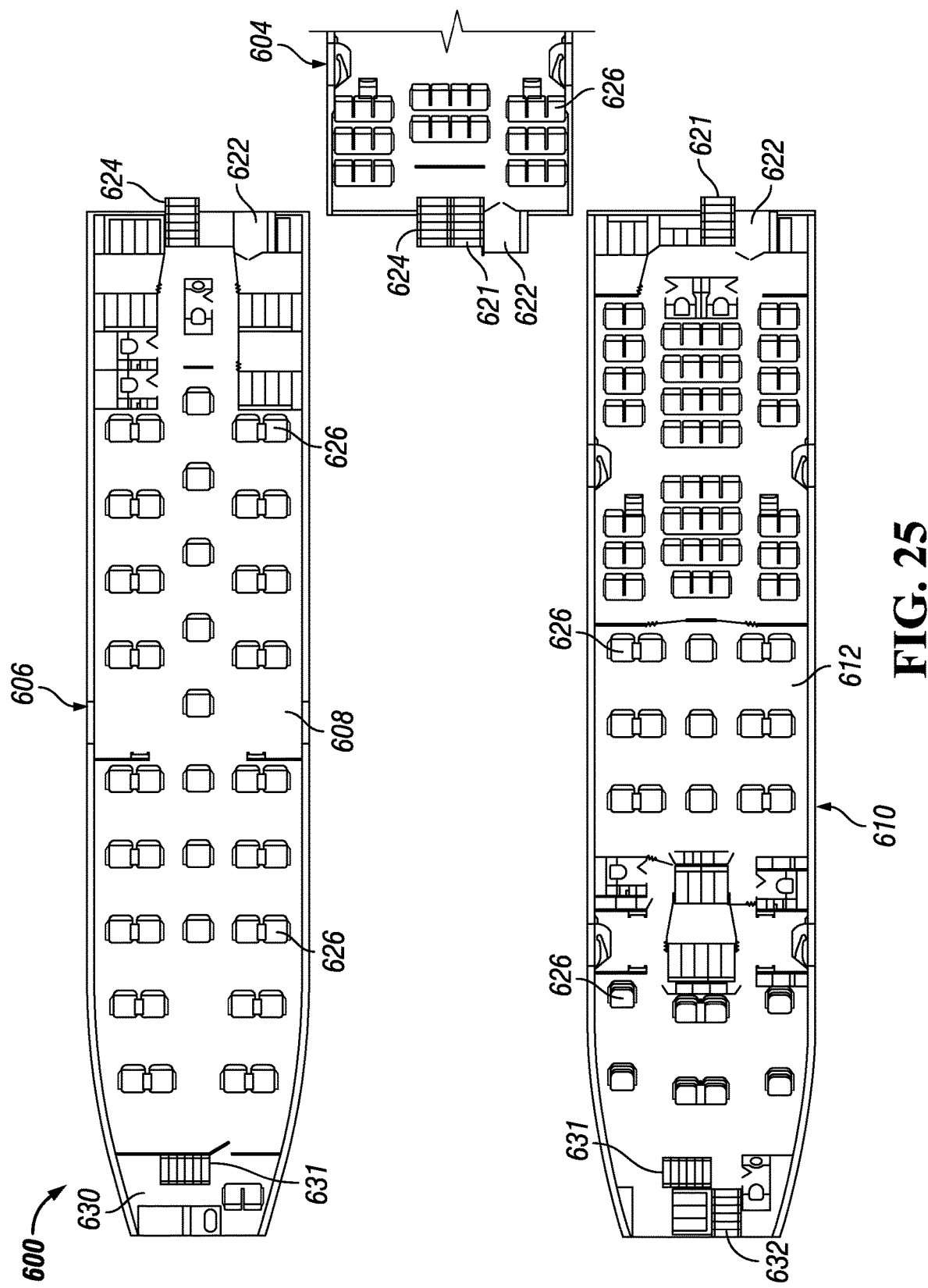
FIG. 25 is a plan view of one embodiment of a cabin layout for a split level forward double deck aircraft.

FIG. 25 is a plan view of one embodiment of a cabin layout 600 for a split level forward double deck aircraft. The cabin layout 600 includes an upper passenger cabin 606 positioned above a lower passenger cabin 610. The upper passenger cabin 606 may include a plurality of passenger seats 626. The forward portion of the upper passenger cabin 606 may include a crew rest area 630. The crew rest area 630 may include a structure 631 that permits traversal between the upper passenger cabin 606 and the lower passenger cabin 610. The floor 608 of the upper passenger cabin 606 may be positioned at a height or elevation above the height or elevation of the floor of the passenger cabin 604 located in an aft portion of the aircraft. The upper passenger cabin 606 includes a structure 624 that permits traversal between the upper passenger cabin 606 and the passenger cabin 604 of the aft portion of the aircraft. The structure 624 may be a flight of stairs, a ladder, an escalator, a lift, a ramp, or other means as would be appreciated by one of ordinary skill in the art having the benefit of this disclosure. The cabin layout 600 also includes an elevator or lift 622 that may be used to access the lower passenger cabin 610, the upper passenger cabin 606, and the aft passenger cabin 604.

A front portion of the lower passenger cabin 610 may permit access to the cockpit via a ladder, ramp, stairs 632, or other structure as would be appreciated by one of ordinary skill in the art having the benefit of this disclosure. A structure 631, which may be a ladder, ramp, or flight of stairs, is located at the front portion of the lower passenger cabin 610 that permits traversal between lower passenger cabin 610 and the upper passenger cabin 606. The lower passenger cabin 610 may include a plurality of passenger seats 626. The floor 612 of the lower passenger cabin 610 may be positioned at a height or elevation below the height or elevation of the floor of the passenger cabin 604 located in an aft portion of the aircraft. The lower passenger cabin 610 includes a structure 621 that permits traversal between the lower passenger cabin 610 and the passenger cabin 604 of the aft portion of the aircraft. As discussed above, the elevator 622 may be also used to access either the aft passenger cabin 604 or the upper passenger cabin 610 from the lower passenger cabin 610.

Figure 26:
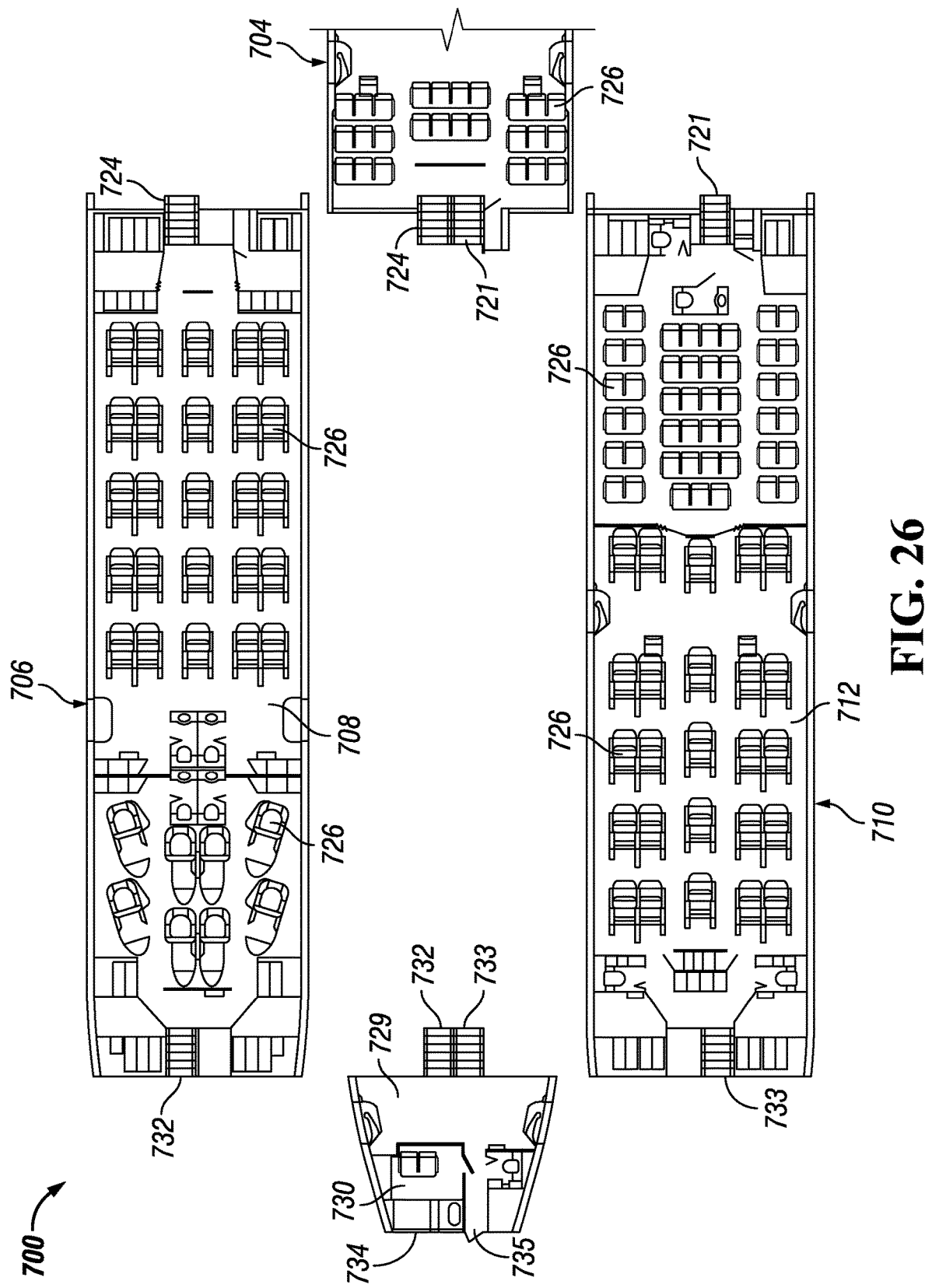
FIG. 26 is a plan view of one embodiment of a cabin layout for a split level forward double deck aircraft.

FIG. 26 is a plan view of one embodiment of a cabin layout 700 for a split level forward double deck aircraft. The cabin layout 700 includes an upper passenger cabin 706 positioned above a lower passenger cabin 710. The upper passenger cabin 706 may include a plurality of passenger seats 726. The forward portion of the upper passenger cabin 706 may include a structure 732, such as a ladder, ramp, or flight of stairs, which permits traversal between the upper passenger cabin 706 and a landing 729. The landing 729 may include a crew rest area 730 and pay provide access 735 to the cockpit. The landing 729 may be adjacent to a flight deck bulkhead 734. The floor 708 of the upper passenger cabin 706 may be positioned at a height or elevation above the height or elevation of the floor of the passenger cabin 704 located in an aft portion of the aircraft. The upper passenger cabin 706 includes a structure 724 that permits traversal between the upper passenger cabin 706 and the passenger cabin 704 of the aft portion of the aircraft. The structure 724 may be a flight of stairs, a ramp, a ladder, an escalator, a lift, or other means as would be appreciated by one of ordinary skill in the art having the benefit of this disclosure.

A front portion of the lower passenger cabin 710 may include a structure 733, such as a ladder, ramp, or flight of stairs, which permits traversal between the lower passenger cabin 710 and the landing 729. The lower passenger cabin 710 may include a plurality of passenger seats 726. The floor 712 of the lower passenger cabin 710 may be positioned at a height or elevation below the height or elevation of the floor of the passenger cabin 704 located in an aft portion of the aircraft. The lower passenger cabin 710 includes a structure 721 that permits traversal between the lower passenger cabin 710 and the passenger cabin 704 of the aft portion of the aircraft. The structure 721 may be a flight of stairs, a ladder, a ramp, an escalator, a lift, or other means as would be appreciated by one of ordinary skill in the art having the benefit of this disclosure.

Figure 27:
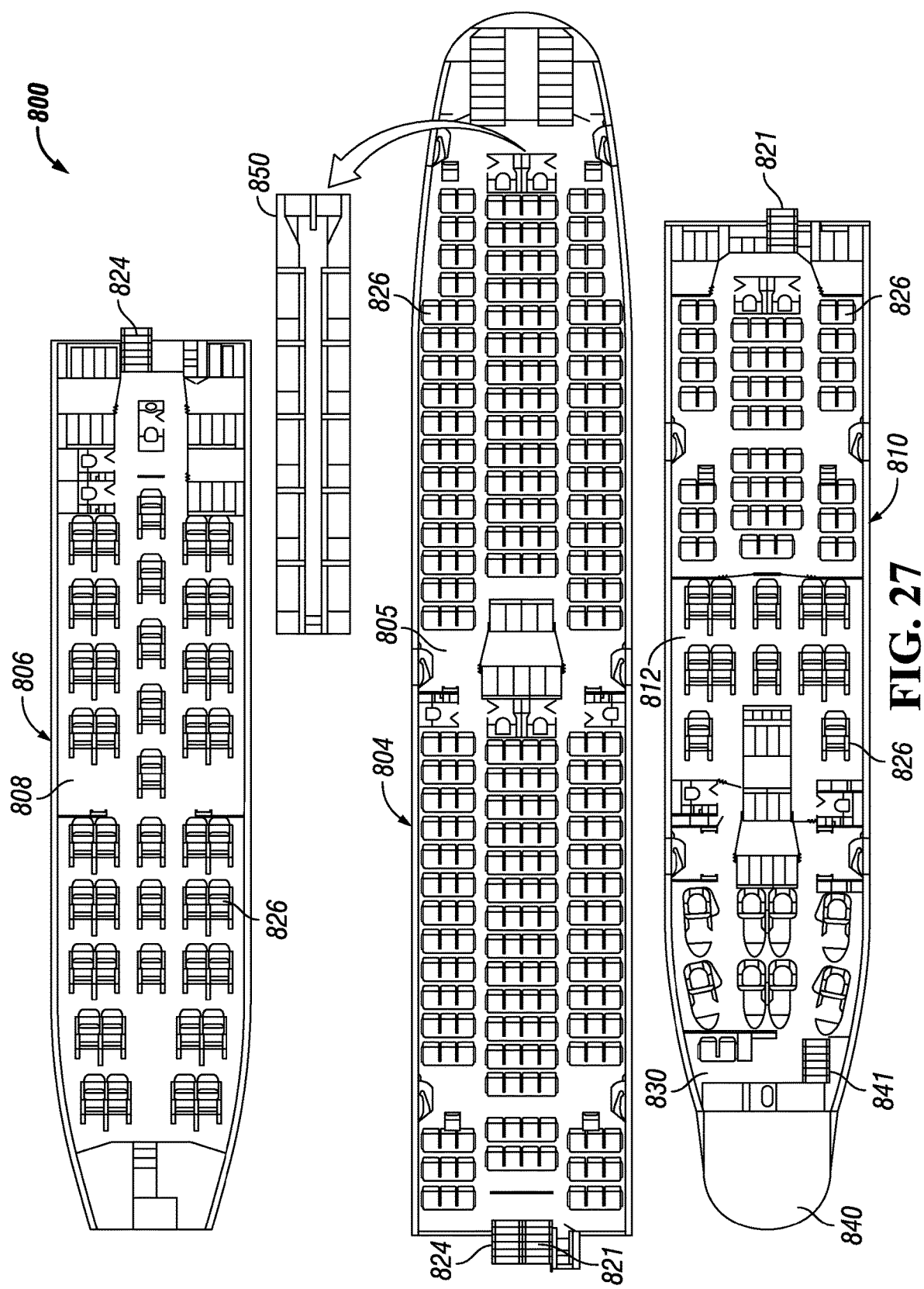
FIG. 27 is a plan view of one embodiment of a cabin layout for a split level forward double deck aircraft.

FIG. 27 is a plan view of one embodiment of a cabin layout 800 for a split level forward double deck aircraft. The cabin layout 800 includes an upper passenger cabin 806 positioned above a lower passenger cabin 810. The upper passenger cabin 806 may include a plurality of passenger seats 826. The floor 808 of the upper passenger cabin 806 may be positioned at a height or elevation above the height or elevation of the floor 805 of the passenger cabin 804 located in an aft portion of the aircraft. The upper passenger cabin 806 includes a structure 824 that permits traversal between the upper passenger cabin 806 and the passenger cabin 804 of the aft portion of the aircraft. The structure 824 may be a flight of stairs, a ladder, a ramp, an escalator, a lift, or other means as would be appreciated by one of ordinary skill in the art having the benefit of this disclosure.

A front portion of the lower passenger cabin 810 may include a crew rest area 830. The crew rest area 830 may include a structure 841, such as a ladder, ramp, or flight of stairs, which permits traversal between the crew rest area 830 and the cockpit 840. The lower passenger cabin 810 may include a plurality of passenger seats 826. The floor 812 of the lower passenger cabin 810 may be positioned at a height or elevation below the height or elevation of the floor 805 of the passenger cabin 804 located in an aft portion of the aircraft. The lower passenger cabin 810 includes a structure 821 that permits traversal between the lower passenger cabin 810 and the passenger cabin 804 of the aft portion of the aircraft. The structure 821 may be a flight of stairs, a ladder, an escalator, a ramp, a lift, or other means as would be appreciated by one of ordinary skill in the art having the benefit of this disclosure.

The passenger cabin 804 of the aft portion of the aircraft may be positioned above a cargo compartment as discussed herein. The passenger cabin 804 may include access to a crew rest area 850 located adjacent to the passenger cabin 804. The crew rest area 850 may be located above or below the passenger cabin 804 as would be appreciated by one of ordinary skill in the art having the benefit of this disclosure.

Figure 28:
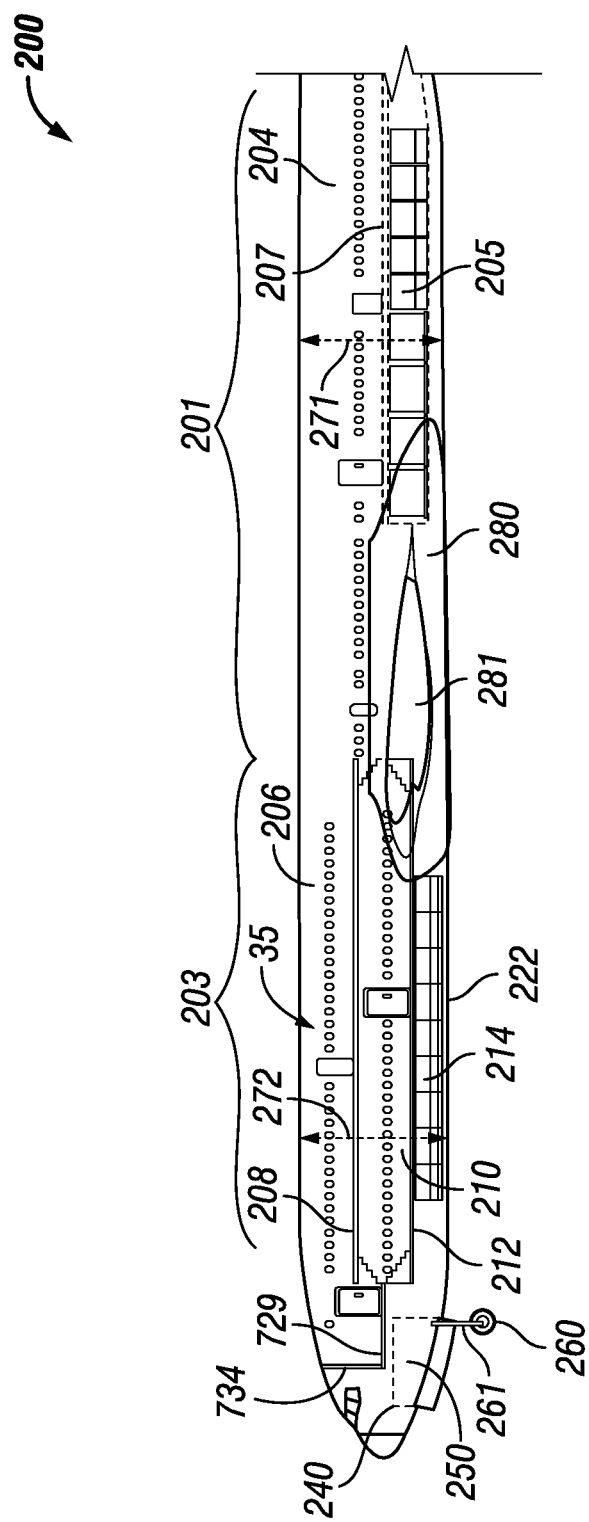
FIG. 28 shows one embodiment of a split level forward double deck aircraft.

FIG. 28 shows a schematic of one embodiment of split level forward double deck aircraft 200 having a lowered forward keel. A the keel is lowered in the forward portion 203 of the aircraft 200 with respect to the aft portion 201, the distance 272 from the crown to the keel of the forward portion 203 will be greater than the distance 271 from the crown to the keel of the aft portion 201 of the aircraft. The aircraft 200 includes landing gear bay 250 for housing the landing gear, wheels 260 and strut 261, and a cockpit 240 position in a forward position of the aircraft 200.

The forward portion 203 of the aircraft 200 is a split level cabin 35 having an upper passenger cabin 206 positioned above both a lower passenger cabin 210 and a cargo compartment or deck 214. The aft portion 201 of the aircraft 200 includes a single passenger cabin 204 positioned above a cargo compartment or deck 205. The floor 208 of the upper passenger cabin 206 is positioned higher than the floor 207 of the single passenger cabin 204 of the aft portion 201 of the aircraft 200. Likewise, the floor 212 of the lower passenger cabin 210 is positioned lower than the floor 207 of the single passenger cabin 204 of the aft portion 201 of the aircraft 200. The aircraft 200 includes an aerodynamic fairing 280 that covers transitions between the lowered keel forward portion 203 and the normal keel of the aft portion 201. The fairing 280 includes an opening 281 for the wingbox of the aircraft 200 as would be appreciated by one of ordinary skill in the art having the benefit of this disclosure. The aircraft 200 may include a landing 729 adjacent to the cockpit 240. A bulkhead 734 may separate the cockpit 240 from the landing 729.

Figure 29:
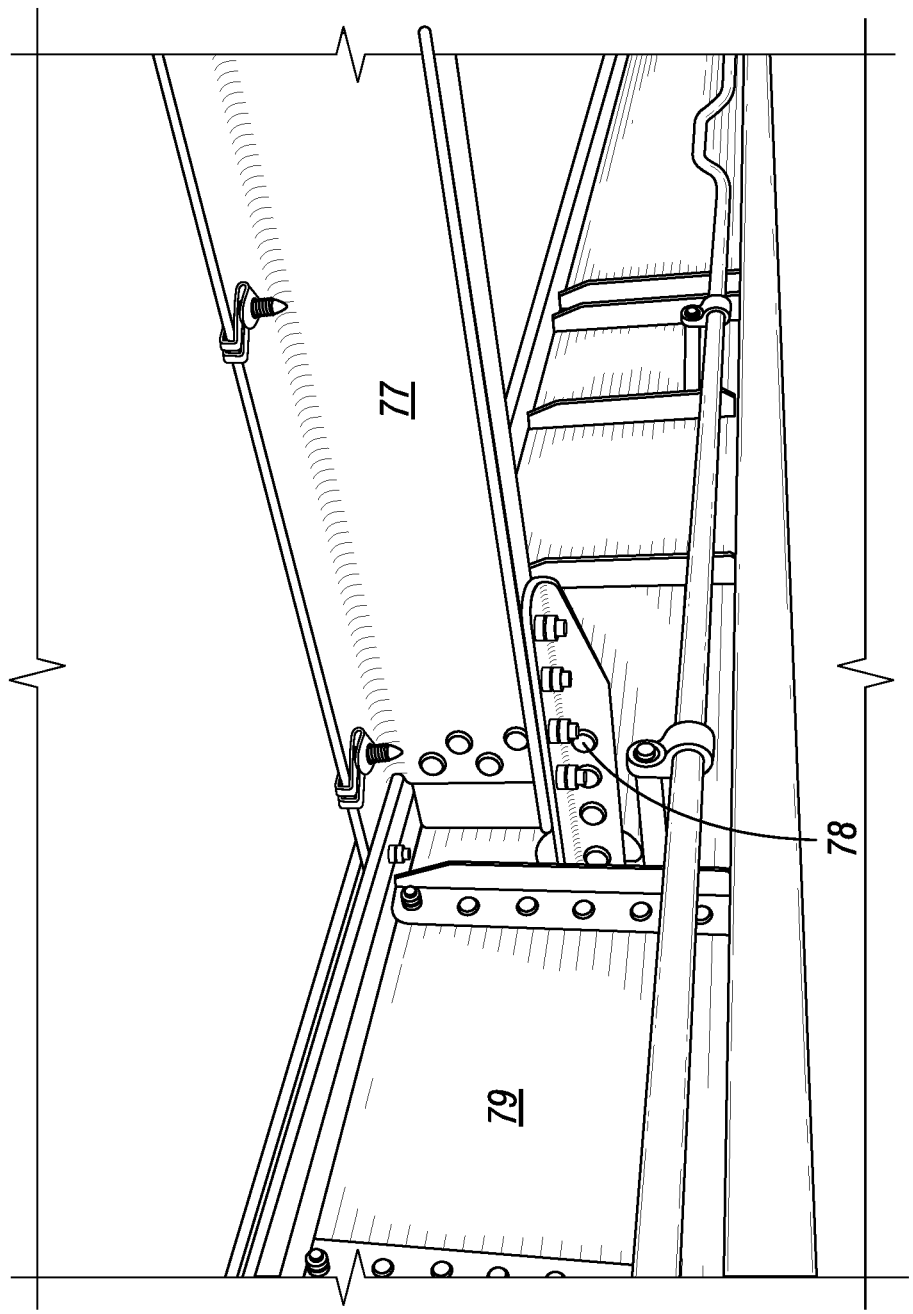
FIG. 29 shows an embodiment of a floor beam for a split level forward double deck aircraft.

The split level forward double deck aircraft 20 may include seat tracks for the floors of the passenger cabins that are integrated in the floor beams. FIG. 29 shows an embodiment of a seat track 77 that is integrated into the floor beam 79 and includes a load transfer attachment fitting 78. The integration of the seat track 77 into the floor beam 79 enables the floor beam 79 to have a smaller depth. In some embodiments, the floor beams 79 may only be 6 inches deep. The floor beams 79 and seat tracks 77 may be comprised of various materials that permit adequate structural strength while allowing minimal footprint. For example, the floor beams 79 and seat tracks 77 may be comprised of an advance metallic alloy such as aluminum-lithium, an advance composite material, or various other materials as would be appreciated by one of ordinary skill in the art having the benefit of this disclosure.

Figure 30:
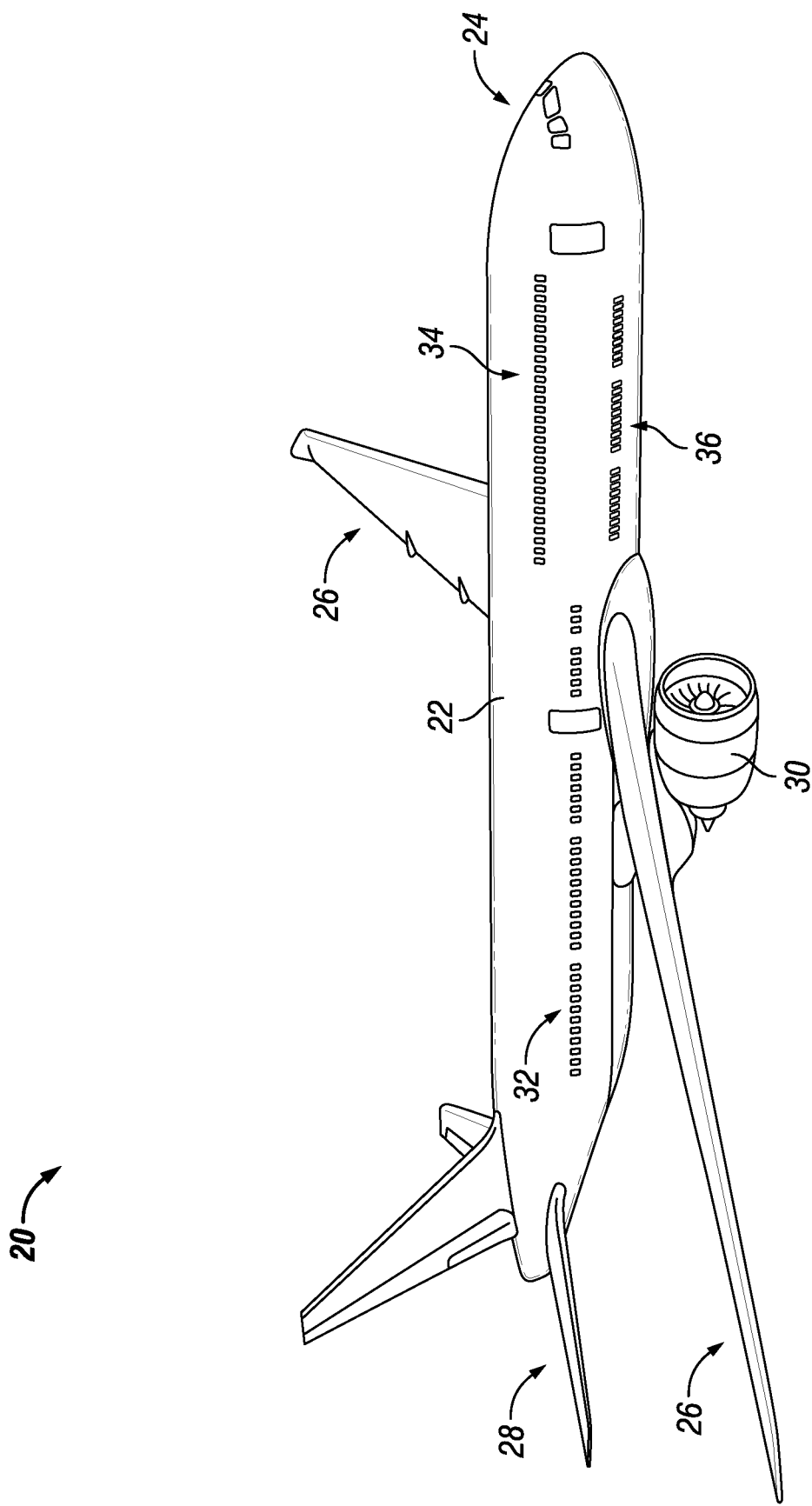
FIG. 30 shows one embodiment of a split level forward double deck aircraft.

FIG. 30 shows a perspective view of one embodiment of a split level forward double deck aircraft 20. The aircraft 20 comprises a fuselage 22 having an attached wing assembly 26 and a tail assembly 28. In the illustrated example, the aircraft is propelled by jet engines 30 mounted on the wing assembly 26. The aircraft 20 may carry any of various types of payloads, including cargo and passengers. The aircraft includes a cockpit 24, a first passenger cabin 32, an upper second cabin 34, and a third lower cabin 36.

Although the embodiments of this disclosure have been described with respect to certain exemplary embodiments, it is to be understood that the specific embodiments are for purposes of illustration and not limitation, as other variations will occur to those of skill in the art.

What is claimed is:

1. An aircraft comprising:
   a fuselage;
   a first passenger cabin having a first floor;
   a split level cabin located in the fuselage forward of the first passenger cabin, the split level cabin including an upper second cabin having a second floor above a level of the first floor, and a lower third cabin beneath the upper second cabin and having a third floor below the level of the first floor; and
   a lower hold compartment located beneath at least a portion of the lower third cabin, wherein the lower hold compartment comprises a bulk cargo compartment or a containerized cargo compartment.

2. The aircraft of claim 1, further comprising a first containerized cargo compartment located below at least a portion of the first passenger cabin and wherein the bulk cargo compartment and the containerized cargo compartment have a cross-sectional area smaller than a cross-sectional area of the first containerized cargo compartment.

3. The aircraft of claim 1, wherein the upper second cabin, the lower third cabin, and the lower hold compartment are vertically stacked within the fuselage.

4. The aircraft of claim 1, further comprising a first structure that permits passenger movement between the first passenger cabin and each of the upper second cabin and the lower third cabin.

5. The aircraft of claim 4, wherein the first structure that permits passenger movement further comprises at least one of a set of stairs, an escalator, a ramp, and an elevator.

6. The aircraft of claim 4, wherein the first structure that permits passenger movement further comprises a first set of stairs at an interface between the first passenger cabin and the upper second and lower third cabins.

7. The aircraft of claim 6, further comprising a second set of stairs that permits passenger movement between the upper second cabin and the lower third cabin.

8. The aircraft of claim 6, further comprising a second structure that permits crew movement between a cockpit and at least one of the upper second cabin and the lower third cabin.

9. The aircraft of claim 8, wherein the second structure further comprises a second set of stairs, a ladder, or an elevator.

10. The aircraft of claim 8, further comprising a landing adjacent to the cockpit and adjacent to a flight deck bulkhead wherein the second structure permits movement between the landing and the upper second cabin or the lower third cabin.

11. The aircraft of claim 8, further comprising a flight crew rest compartment located substantially at a level of one of the cockpit, the upper second cabin, or the lower third cabin.

12. The aircraft of claim 1, wherein a first portion of the fuselage is substantially adjacent to the second upper and third lower cabins, and has a substantially first cross sectional shape along a length of the first portion, wherein a second portion of the fuselage is substantially adjacent to the first passenger cabin and has a substantially second cross sectional shape along a length of the second portion, and wherein the first cross sectional shape is larger than the second cross sectional shape.

13. The aircraft of claim 1, wherein a first portion of the fuselage is substantially adjacent to the second upper and third lower cabins and has a substantially first cross sectional shape along a length of the first portion, wherein a second portion of the fuselage is substantially adjacent to the first passenger cabin and has a substantially second cross sectional shape along a length of the second portion, and wherein the first cross sectional shape has a lowered keel line relative to the second cross sectional shape.

14. The aircraft of claim 13, wherein an aft portion of the lowered keel line of the first portion of the fuselage is aerodynamically faired into an adjacent region of a wing-to-body fairing with a keel line that is no higher than the lowered keel line of the first portion of the fuselage.

15. The aircraft of claim 1, further comprising a crushable zone within the fuselage beneath the lower third cabin for absorbing energy of an impact of the fuselage during a crash landing.

16. The aircraft of claim 15, wherein the fuselage further comprises a keel and the crushable zone comprises at least 30 inches of vertical height between the third floor and the keel including the lower hold compartment.

17. The aircraft of claim 1, wherein a portion of the first floor is positioned above a main landing gear wheel well and wherein a portion of the third floor is positioned above a nose landing gear wheel well, the nose landing gear wheel well comprising a bulkhead that inhibits a nose landing gear from penetrating the lower third cabin under failure conditions of the nose landing gear.

18. The aircraft of claim 17, wherein a portion of the first floor is positioned above a wing center section structure, which wing center section structure is positioned forward of the main landing gear wheel well.

19. The aircraft of claim 18, further comprising a powered transport means for vertically transporting at least one of a galley cart and a person between the first passenger, second upper, and third lower cabins at a location forward of the wing center section structure.

20. The aircraft of claim 1, further comprising a rest compartment located above the first passenger cabin with access means including steps means and transit passage means, for cabin crew to enter the rest compartment from at least one of the first cabin and the upper second cabin.

21. The aircraft of claim 1, further comprising:
at least a first door in the fuselage at the level of the first passenger cabin to enable egress of one of passengers and cargo from the first passenger cabin;
at least a second door in the fuselage at a level of the second upper cabin to enable egress of one of passengers and cargo from the second upper cabin;
at least a third door in the fuselage at a level of the third lower cabin to enable egress of one of passengers and cargo from the third lower cabin; and
at least a fourth door in the fuselage at a level of the lower hold compartment to enable at least one of loading cargo and providing aircraft systems servicing access into the lower hold compartment.

22. The aircraft of claim 1, wherein a first end of the upper second cabin and a first end of the lower third cabin are both adjacent to the first passenger cabin and wherein a second end of the upper second cabin and a second end of the lower third cabin are both adjacent to a cockpit.

23. A modified commercial aircraft, comprising:
a crown section that is substantially identical to a crown section of a base aircraft;
an aft fuselage portion that is substantially identical to the base aircraft, having a first cabin with a first floor level;
a forward fuselage portion having a lowered keel in comparison to the base aircraft;
a forward split level cabin within the forward fuselage portion, including an upper second cabin having a second floor above the level of the first floor, and a lower third cabin beneath the upper second cabin and having a third floor below the level of the first floor; and
a forward cargo deck, within the lowered forward portion of the fuselage and beneath at least a portion of the lower third cabin;
wherein the modified aircraft has a passenger capacity that is greater than a passenger capacity of the base aircraft, and a cargo capacity that is less than a cargo capacity of the base aircraft.

24. The aircraft of claim 23, further comprising a modified fairing on a belly of the fuselage, the modified fairing defining a transition between the lowered keel of the forward fuselage portion and a keel of the aft fuselage portion.

25. The aircraft of claim 24, wherein the upper second cabin, the lower third cabin, and the forward cargo deck are vertically stacked within the fuselage.

26. The aircraft of claim 24, further comprising a first structure that permits passenger movement between the first cabin and each of the upper second cabin and the lower third cabin.

27. A method for reconfiguring a base aircraft into a derivative aircraft configuration, the base aircraft comprising a fuselage, including a crown section and a keel; a first cabin, having a first floor at a substantially constant level within an aft portion of the fuselage; an aft cargo deck located below the first floor; and a base passenger capacity, a base cargo capacity, a maximum takeoff weight and a flight surface geometry, the method comprising:
lowering a forward portion of the keel while keeping the crown section substantially constant fore-to-aft;
providing a split level cabin within a forward portion of the fuselage, the split level cabin including an upper second cabin having a second floor above the level of the first floor, and a lower third cabin beneath the upper second cabin and having a third floor below the level of the first floor; and
providing a forward cargo deck, within the lowered aft portion of the fuselage and beneath at least a portion of the lower third cabin;
wherein the derivative aircraft configuration has a passenger capacity that is greater than the base aircraft passenger capacity, and a cargo capacity that is less than the base aircraft cargo capacity.

28. The method of claim 27, further comprising providing an aerodynamic fairing transitioning between the keel of the aft portion of the fuselage and the lowered keel of the forward portion of the fuselage.

29. The method of claim 28, further comprising providing a structure that permits movement between the upper second cabin, the lower third cabin, and the first cabin.

30. The method of claim 27, wherein lowering the forward portion of the keel for the derivative aircraft configuration enables a lowered location for a nose landing gear trunnion and a shorter landing gear strut than for the base aircraft.

* * * * *